US011311921B2

(12) United States Patent
Suzuki

(10) Patent No.: US 11,311,921 B2
(45) Date of Patent: Apr. 26, 2022

(54) ULTRAFINE BUBBLE CLEANING METHOD USING ULTRAFINE BUBBLE-CONTAINING LIQUID, APPARATUS THEREFOR, AND DISSOLVED AIR FLOATATION APPARATUS

(71) Applicant: PCS CO., LTD., Sapporo (JP)

(72) Inventor: Toshikatsu Suzuki, Sapporo (JP)

(73) Assignee: PCS CO., LTD., Sapporo (JP)

( * ) Notice: Subject to any disclaimer, the term of this patent is extended or adjusted under 35 U.S.C. 154(b) by 15 days.

(21) Appl. No.: 16/998,410

(22) Filed: Aug. 20, 2020

(65) Prior Publication Data
US 2020/0376526 A1 Dec. 3, 2020

Related U.S. Application Data

(60) Division of application No. 16/047,920, filed on Jul. 27, 2018, now abandoned, which is a continuation of
(Continued)

(30) Foreign Application Priority Data

Mar. 14, 2014 (JP) ................................ 2014-052788
Oct. 6, 2014 (JP) ................................ 2014-206019
Dec. 19, 2014 (JP) ................................ 2014-258025

(51) Int. Cl.
*B09C 1/02* (2006.01)
*G21F 9/10* (2006.01)
(Continued)

(52) U.S. Cl.
CPC ............ *B09C 1/02* (2013.01); *B01D 21/0084* (2013.01); *B01D 21/01* (2013.01); *B01D 21/267* (2013.01);
(Continued)

(58) Field of Classification Search
CPC .......... B03B 5/28; B09C 1/02; B01D 21/0084
See application file for complete search history.

(56) References Cited

U.S. PATENT DOCUMENTS 5,376,182 A 12/1994 Everett et al.
2008/0148784 A1 6/2008 Ikematsu et al.
2009/0159536 A1 6/2009 Hong

FOREIGN PATENT DOCUMENTS

JP H05212361 A 8/1993
JP H05277402 A 10/1993
(Continued)

OTHER PUBLICATIONS

Jul. 7, 2015 International Search Report issued in International Patent Application No. PCT/JP2015/057469.
(Continued)

*Primary Examiner* — Spencer E. Bell
(74) *Attorney, Agent, or Firm* — Oliff PLC

(57) ABSTRACT

A dissolved air floatation apparatus including an ultrafine bubble-containing liquid production device and a dissolved air floatation tank. The ultrafine bubble-containing liquid production device includes a gas-liquid mixing unit and a bubble-containing liquid separation device. The bubble-containing liquid separation device swirls a liquid containing ultrafine bubbles and larger bubbles in a storage tank to concentrate the liquid that contains the ultrafine bubbles and the liquid that contains the larger bubbles to a central part of the swirling flow followed by discharge. A pressurized ultrafine bubble-containing liquid is mixed in a raw liquid containing a subject to be cleansed and is poured into the dissolved air floatation tank to cause a suspended substance and a dissolved component in the raw liquid to be adsorbed on an interface of fine bubbles and be floated in the dissolved air floatation tank to be extracted.

1 Claim, 15 Drawing Sheets

Related U.S. Application Data application No. 15/125,337, filed as application No. PCT/JP2015/057469 on Mar. 13, 2015, now abandoned.

(51) Int. Cl.

| | | |
|---|---|---|
| *C02F 1/24* | (2006.01) | |
| *B03D 1/14* | (2006.01) | |
| *B01D 21/00* | (2006.01) | |
| *B01D 21/01* | (2006.01) | |
| *B01D 21/26* | (2006.01) | |
| *B03D 1/00* | (2006.01) | |
| *B08B 3/10* | (2006.01) | |
| *B01J 20/20* | (2006.01) | |
| *G21F 9/12* | (2006.01) | |
| *B01J 20/14* | (2006.01) | |
| *B01J 20/26* | (2006.01) | |
| *B01J 20/28* | (2006.01) | |
| *G21F 9/04* | (2006.01) | |
| *C02F 1/52* | (2006.01) | |
| *G21F 9/30* | (2006.01) | |
| *C02F 1/28* | (2006.01) | |
| *C02F 1/56* | (2006.01) | |
| *C02F 101/00* | (2006.01) | |

(52) U.S. Cl.
CPC ............... *B01J 20/14* (2013.01); *B01J 20/20* (2013.01); *B01J 20/205* (2013.01); *B01J 20/262* (2013.01); *B01J 20/28045* (2013.01); *B03D 1/00* (2013.01); *B03D 1/1418* (2013.01); *B03D 1/1431* (2013.01); *B03D 1/1456* (2013.01); *B03D 1/1462* (2013.01); *B03D 1/1475* (2013.01); *B08B 3/10* (2013.01); *C02F 1/24* (2013.01); *C02F 1/5281* (2013.01); *G21F 9/04* (2013.01); *G21F 9/10* (2013.01); *G21F 9/12* (2013.01); *G21F 9/30* (2013.01); *B01J 2220/46* (2013.01); *B01J 2220/49* (2013.01); *C02F 1/28* (2013.01); *C02F 1/5236* (2013.01); *C02F 1/56* (2013.01); *C02F 2101/006* (2013.01); *C02F 2305/08* (2013.01)

(56) References Cited

FOREIGN PATENT DOCUMENTS

| | | |
|---|---|---|
| JP | 2004230367 A | 8/2004 |
| JP | 2009056426 A | 3/2009 |
| JP | 2009273984 A | 11/2009 |
| JP | 2010-162518 A | 7/2010 |
| JP | 2011-066389 A | 3/2011 |
| JP | 2012242254 A | 12/2012 |
| JP | 2013-140096 A | 7/2013 |
| JP | 2013148569 A | 8/2013 |
| JP | 2013-180213 A | 9/2013 |
| JP | 2013178149 A | 9/2013 |
| JP | 2013195165 A | 9/2013 |
| JP | 2014016301 A | 1/2014 |
| WO | 2012-165488 A1 | 12/2012 |

OTHER PUBLICATIONS

Sep. 15, 2016 International Preliminary Report on Patentability issued in International Application No. PCT/JP2015/057469.
Nov. 15, 2016 Office Action issued in Japanese Patent Application No. 2016-507844.
May 29, 2018 Office Action issued in U.S. Appl. No. 15/125,337.
Machine Translation JPH05277402A (Year: 1993).

ULTRAFINE BUBBLE CLEANING METHOD USING ULTRAFINE BUBBLE-CONTAINING LIQUID, APPARATUS THEREFOR, AND DISSOLVED AIR FLOATATION APPARATUS

This is a Divisional application Ser. No. 16/047,920 filed Jul. 27, 2018, which in turn is Continuation of application Ser. No. 15/125,337 filed Sep. 12, 2016, which in turn is a National Stage Entry of PCT/JP2015/057469 filed Mar. 13, 2015, which claims the benefit of Japanese Patent Application No. 2014-258025 filed Dec. 19, 2014, Japanese Patent Application No. 2014-206019 filed on Oct. 6, 2014, and Japanese Patent Application No. 2014-052788 filed Mar. 14, 2014. The disclosure of the prior applications is hereby incorporated by reference herein in its entirety.

TECHNICAL FIELD

The present invention relates to an ultrafine bubble cleaning method using ultrafine bubbles, an apparatus therefor, and a dissolved air floatation apparatus.

BACKGROUND ART

A dissolved air floatation apparatus is an apparatus in which solid-liquid separation is performed by attaching fine bubbles to a substance that is suspended in water to decrease the apparent specific gravity. In this apparatus, for example, when air is added to water, dissolved in water under pressure, and then released at atmospheric pressure, generated fine bubbles are adhered to the suspended substance in water, and float with the suspended substance to the surface of the water. Water except for a floating substance collected by skimmer or the like becomes treated water.

As disclosed in Patent Literature 1, for example, many dissolved air floatation apparatuses have been proposed. However, the size of suspended substance allowed to float to the surface of a liquid is limited depending on the size of fine bubbles. Patent Literature 1 describes a case where air is added to water, and that air bubbles with a diameter of several hundreds nm or less, referred to as nanobubbles, are used. However, in fact, the minimum value is estimated to be 100 nm.

Even when fine bubbles are adhered to a suspended substance with a diameter smaller than that of the bubbles, it is said that the bubbles cannot cause the suspended substance to float to the surface of liquid. For example, there is a problem in which, when cesium that is a radioactive waste material is present in an ionic state in water, fine bubbles of 100 nm cannot cause cesium ions to be separated from water.

Various production devices of water containing fine bubbles (so-called nanobubble water) for producing fine bubbles used in the dissolved air floatation apparatus have also been proposed. However, the size of fine bubbles that can be produced is proposed to be up to about 30 nm in a laboratory scale. A range of the size at which fine bubbles can be stably produced in large amounts is up to several hundreds nm. Measurement of bubbles with a size of 30 nm or less is difficult.

For example, when water is poured into an oil field and then pumped with crude oil and separation is performed into oil and water, the obtained water has a problem in which recycle is impossible due to fine oil droplets dispersed therein. The fine oil droplets are tried to be floated and separated by capture by fine bubbles of 100 nm or more. However, there is no opportunity of bringing the fine bubbles into sufficient contact with the fine oil droplets.

CITATION LIST

Patent Literature

Patent Literature 1: Japanese Patent Application Laid-Open No. 2010-162518

SUMMARY OF INVENTION

Technical Problem

The present invention was made in view of the above-described conventional problems. An object of the present invention is to provide an ultrafine bubble cleaning method using an ultrafine bubble-containing liquid containing ultrafine bubbles having a size of less than 30 nm, an apparatus therefor, and a dissolved air floatation apparatus.

Solution to Problem

The present inventor has intensively studied, and as a result, completed an ultrafine bubble cleaning method using an ultrafine bubble-containing liquid containing ultrafine bubbles having a size of less than 30 nm and 3 Å or more, an apparatus therefor, and a dissolved air floatation apparatus.

Specifically, the above-described problems can be solved by the following embodiments.

((1) An ultrafine bubble cleaning method for cleaning a substance to be cleaned, comprising: swirling a liquid containing ultrafine bubbles having a size of 3 Å or more and less than 30 nm and bubbles larger than the ultrafine bubbles to concentrate apart thereof that contains the ultrafine bubbles and has a relatively large specific gravity outside a swirling flow, and concentrate a part thereof that contains bubbles larger than the ultrafine bubbles and has a relatively small specific gravity to a central part of the swirling flow followed by discharge, storing the ultrafine bubble-containing liquid containing the ultrafine bubbles concentrated outside in a reservoir, such as a water tank and a pond, stirring the ultrafine bubble-containing liquid in a state in which the substance to be cleaned, such as soil, sand, stone, fallen leaves, rubble, boards, and sheets, is contained, washing off fine particles adhered to the substance to be cleaned while causing the fine particles to be adsorbed on an interface of the ultrafine bubbles, causing the fine particles to be floated as a floated and separated substance, and causing the substance to be cleaned in which the fine particles are rinsed off to be settled as sedimentation isolates; and discharging a supernatant containing the floated and separated substance.

When the ultrafine bubble-containing liquid is stirred, ultrafine bubbles get into an internal of the substance to be cleaned, such as soil and sand with a radioactive substance adhered thereto, or a space between the substance and the adhered substance, adhered to fine particles such as cesium getting into or adhered to the soil and sand, and discharged outside. As a result, the fine particles adhered to the substance to be cleaned are cleaned off.

The fine particles with the ultrafine bubbles adhered thereto are floated as a floated and separated substance to a surface of the liquid, and soil and sand to which ultrafine bubbles are not adhered are settled as sedimentation isolates at the bottom of a reservoir. The fine particles with adhered bubbles that are larger than the ultrafine bubbles are intended to be settled because the bubbles are broken during floating. However, ultrafine bubbles are adhered to the fine particles to cause them to float. The sedimentation isolates hardly contain cesium etc. Therefore, when a supernatant containing the floated and separated substance is discharged, the sedimentation isolates can be returned to the earth. It should be noted that cleaning may be repeated a plurality of times until cesium etc. are separated.

(2) An ultrafine bubble cleaning method comprising: swirling water containing ultrafine bubbles having a size of 3 Å or more and less than 30 nm and bubbles larger than the ultrafine bubbles to concentrate a part thereof that contains the ultrafine bubbles and has a relatively large specific gravity outside the swirling flow, and concentrate a part thereof that contains bubbles larger than the ultrafine bubbles and has a relatively small specific gravity to the central part of the swirling flow followed by discharge, and mixing and stirring the ultrafine bubble-containing water containing the ultrafine bubbles that is concentrated outside in raw water in which fine droplets of an organic substance such as oil and insulating oil, are dispersed to attach the ultrafine bubbles to the fine droplets and cause the fine droplets to be floated and separated due to buoyancy of the ultrafine bubbles.

The organic substance is adsorbed to bubbles. When the bubbles are fine bubbles, the bubbles are very likely to come into contact with the fine droplets dispersed in raw water. Thus, the ultrafine bubbles can be allowed to be adhered to most of the fine droplets, and the buoyancy of the ultrafine bubbles can cause the fine droplets to be floated and separated from the raw water.

(3) An ultrafine bubble cleaning apparatus comprising: an ultrafine bubble-containing liquid production devices swirling a liquid containing ultrafine bubbles having a size of 3 Å or more and less than 30 nm and bubbles larger than the ultrafine bubbles to concentrate a part thereof that contains the ultrafine bubbles and has a relatively large specific gravity outside a swirling flow, and concentrate a part thereof that contains bubbles larger than the ultrafine bubbles and has a relatively small specific gravity to a central part of the swirling flow followed by discharge. a reservoir, such as a water tank and a pond, in which an ultrafine bubble-containing liquid is stored and a substance to be cleaned, such as soil, sand, stone, fallen leaves, rubble, boards, and sheets can be contained in the stored liquid;

a stirring device that is provided in the reservoir and configured to stir the liquid stored thereinside;

a supernatant discharging device configured to discharge, of a floated and separated substance that is adsorbed on an interface of ultrafine bubbles in the ultrafine bubble-containing liquid and sedimentation isolates that are not adsorbed, a supernatant containing the floated and separated substance after precipitation of the sedimentation isolates; and a sedimentation extraction device configured to extract the sedimentation isolates.

(4) An ultrafine bubble cleaning apparatus comprising:

an ultrafine bubble-containing liquid production device swirling a liquid containing ultrafine bubbles having a size of 3 Å or more and less than 30 nm and bubbles larger than the ultrafine bubbles to concentrate a part thereof that contains the ultrafine bubbles and has a relatively large specific gravity outside a swirling flow, and concentrate a part thereof that contains bubbles larger than the ultrafine bubbles and has a relatively small specific gravity to a central part of the swirling flow followed by discharge; a reservoir configured to be capable of containing raw water in which fine droplets of an organic substance, such as oil and insulating oil, are dispersed; an ultrafine bubble-containing water supply device configured to supply an ultrafine bubble-containing water produced by the ultrafine bubble-containing water production device to raw water of the reservoir; a stirring device that is provided in the reservoir and configured to stir the raw water stored thereinside; and a floated substance and liquid discharging device configured to discharge fine droplets that are adsorbed on an interface of ultrafine bubbles in the ultrafine bubble-containing liquid and floated by the stirring.

(5) A dissolved air floatation apparatus comprising: an ultrafine bubble-containing liquid production devices swirling a liquid containing ultrafine bubbles having a size of 3 Å or more and less than 30 nm and bubbles larger than the ultrafine bubbles to concentrate a part thereof that contains the ultrafine bubbles and has a relatively large specific gravity outside a swirling flow, and concentrate a part thereof that contains bubbles larger than the ultrafine bubbles and has a relatively small specific gravity to a central part of the swirling flow followed by discharge, and a dissolved air floatation tank provided with an inlet at one end, wherein a pressurized ultrafine bubble-containing liquid is mixed in a raw liquid and is poured into the dissolved air floatation tank from the inlet to cause a suspended substance and a dissolved component in the raw liquid to be adsorbed on an interface of ultrafine bubbles and be floated in the dissolved air floatation tank, and the suspended substance and the dissolved component are extracted as a suspended and separated substance from the raw liquid, and a remaining raw liquid is discharged as a treated liquid, the dissolved air floatation apparatus comprising:

a circulating device configured to circulate a mixed liquid of the raw liquid and the ultrafine bubble-containing liquid in the dissolved air floatation tank; and a floated and separated substance collecting device configured to extract a floated and separated substance that is floated to a liquid surface by ultrafine bubbles contained in the ultrafine bubble-containing liquid in the dissolved air floatation tank.

The liquid is not limited to water, and may be alcohols, seawater, or oils. The gas is not limited to air, and may be oxygen, hydrogen, nitrogen, carbon dioxide gas, rare gas, or methane gas.

Advantageous Effects of Invention

The present invention has an effect that can clean the aforementioned soil and sand, rubble, etc. with an ultrafine bubble-containing liquid containing ultrafine bubbles that are also adhered to small particles that cannot be conventionally floated by bubbles having a size of 30 nm or more and cause the particles to float.

DESCRIPTION OF EMBODIMENTS

Hereinafter, embodiments of the present invention will be described with reference to the drawings.

First Embodiment

An ultrafine bubble cleaning method using an ultrafine bubble-containing liquid and an apparatus therefor according to a first embodiment will be described.

Figure 1:
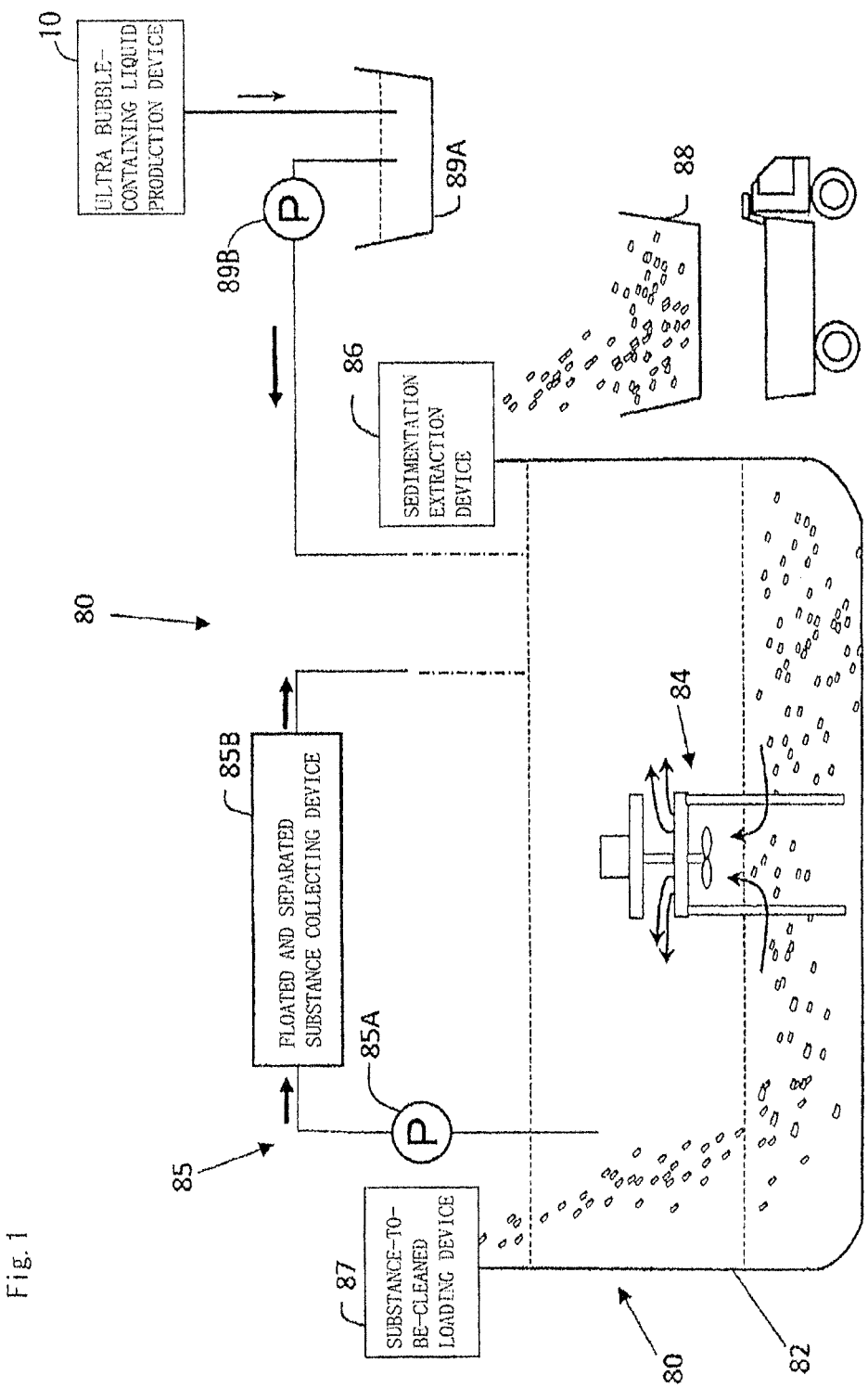
FIG. 1 is a cross-sectional view schematically showing an ultrafine bubble cleaning apparatus according to a first embodiment of the present invention.

As shown in FIG. 1, an ultrafine bubble cleaning apparatus 80 according to the first embodiment is configured to include a water tank-shaped reservoir 82, a stirring device 84 for stirring a liquid in the reservoir 82, the stirring device 84 being disposed at the center of the reservoir 82, a supernatant discharge device 85 including a pump for discharging a supernatant of the liquid in the reservoir 82, and a sedimentation extraction device 86 for extracting sedimentation isolates that have been settled at the bottom of the reservoir 82.

A substance-to-be-cleaned loading device 87 is disposed on a side opposite to the sedimentation extraction device 86 in the reservoir 82, and is configured to load the substance to be cleaned such as soil, sand, fallen leaves, rubble, boards, and sheets into the reservoir 82.

In the first embodiment, the supernatant discharge device 85 includes a pump 85A for sucking the supernatant of the liquid in the reservoir 82 and a floated and separated substance collecting device 85B for removing a floated and separated substance from the supernatant containing the floated and separated substance that is sucked by the pump 85A.

The supernatant after removal of the floated and separated substance by the floated and separated substance collecting device 85B is returned to the reservoir 82. A cleaned substance extracted by the sedimentation extraction device 86 is loaded into a hopper 88, and water is drained at the hopper 88. After that, for example, the cleaned substance is discharged outside by a dump truck or a power shovel, or returned to its original place.

An ultrafine bubble-containing liquid supplied to the reservoir 82 is produced, for example, by an ultrafine bubble-containing liquid production device 10 (see FIG. 10) described below, stored in a tank 89A, and supplied to the reservoir 82 by a pump 89B.

In the ultrafine bubble cleaning apparatus 80 according to the first embodiment, the substance to be cleaned such as soil and sand is loaded into the ultrafine bubble-containing liquid stored in the reservoir 82 by the substance-to-be-cleaned loading device 87, and the ultrafine bubble-containing liquid is repeatedly brought into contact with a surface of the substance to be cleaned using the stirring device 84.

When ultrafine bubbles get into a space between fine particles adhered to the surface, cracks, and pits of the substance to be cleaned, such as metal particles (including metal ions) and fine particles of organic substances including a solvent, a chemical, and an oil, and the substance to be cleaned, the fine particles are separated and floated with the ultrafine bubbles adhered thereto. When large bubbles are adhered to the substance to be cleaned and the fine particles, the substance to be cleaned and the fine particles may be floated. However, buoyancy is lost by breaking the large bubbles during floating.

Although the ultrafine bubbles are adhered to the substance to be cleaned and the fine particles again, the ultrafine bubbles do not have buoyancy of floating the substance to be cleaned, and the fine particles are only floated.

The floated fine particles are the floated and separated substance. In contrast, the rest includes the sedimentation isolates, and is deposited at the bottom of the reservoir 82.

The floated and separated substance collecting device 85B is configured, for example, by a dissolved air floatation apparatus according to a second embodiment described below. Herein, when the floated and separated substance with the ultrafine bubbles adhered thereto is incorporated into a flocculant or the ultrafine bubbles are adhered to a flocculant with the fine particles incorporated therein, the floated and separated substance or the flocculant is floated and separated. The rest is treated water, and is returned to the reservoir 82 as a cleaning liquid.

As described above, the sedimentation isolates are deposited at the bottom of the reservoir 82, and extracted by the sedimentation extraction device 86, for example, a power shovel, and loaded into the external hopper 88.

After water is drained at the hopper 88, the sedimentation isolates are transported by a dump truck or the like. However, the ultrafine bubble-containing liquid adhered to the sedimentation isolates are lost during draining at the hopper 88. Therefore, the stored ultrafine bubble-containing liquid is supplied to the reservoir 82 from the tank 89A by the pump 89B.

According to an experiment, soil that had been contaminated with radioactive cesium and had a dosage of radiation of 2,200 bq/kg in a drying state as a sample 1 was cleaned with ultrafine bubble-containing water by the ultrafine bubble cleaning apparatus 80 for 10 minutes. The dosage of radiation of radioactive cesium of the substance to be cleaned after cleaning was 120 bq/kg.

Similarly, the dosage of radiation of soil having a dosage of radiation of 3,000 bq/kg as a sample 2 was decreased to 240 bq/kg after cleaning, that of soil having a dosage of radiation of 2,500 bq/kg as a sample 3 was decreased to 210 bq/kg, and that of soil having a dosage of radiation of 2,200 bq/kg as a sample 4 was decreased to 980 bq/kg. Furthermore, that of fallen leaves having a dosage of radiation of 8,700 bq/kg as a sample was decreased to 5, 400 bq/kg.

The soils as the samples 1 to 4 were further cleaned for 10 minutes. As a result, the dosages of radiation thereof were each 100 bq/kg or less.

In the ultrafine bubble cleaning apparatus 80 according to the above-described first embodiment, the substance to be cleaned is subjected to batch processing. However, the present invention is not limited to the batch processing, and continuous processing may be performed.

Figure 2:
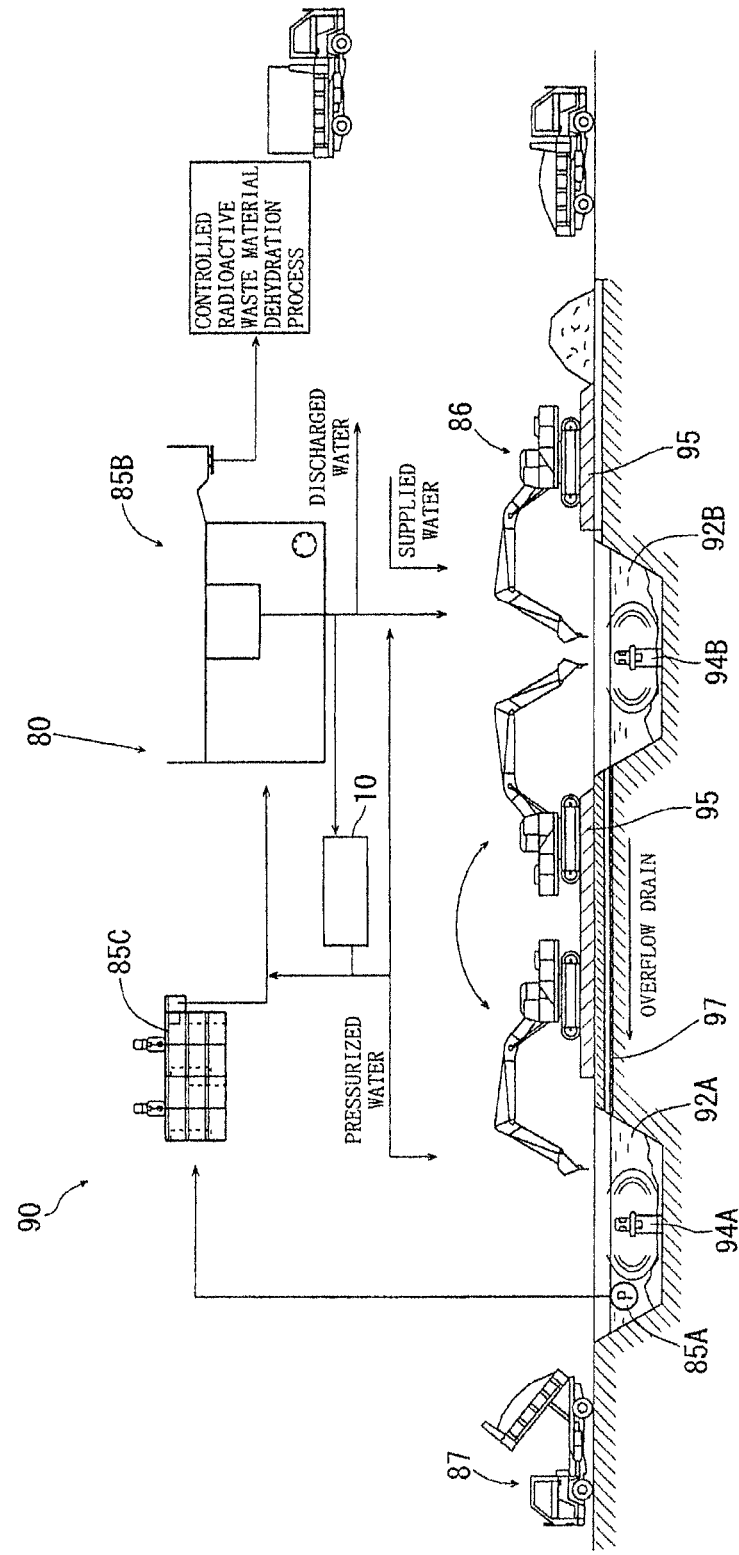
FIG. 2 is a cross-sectional view schematically showing a modified example of the ultrafine bubble cleaning apparatus.
Figure 3:
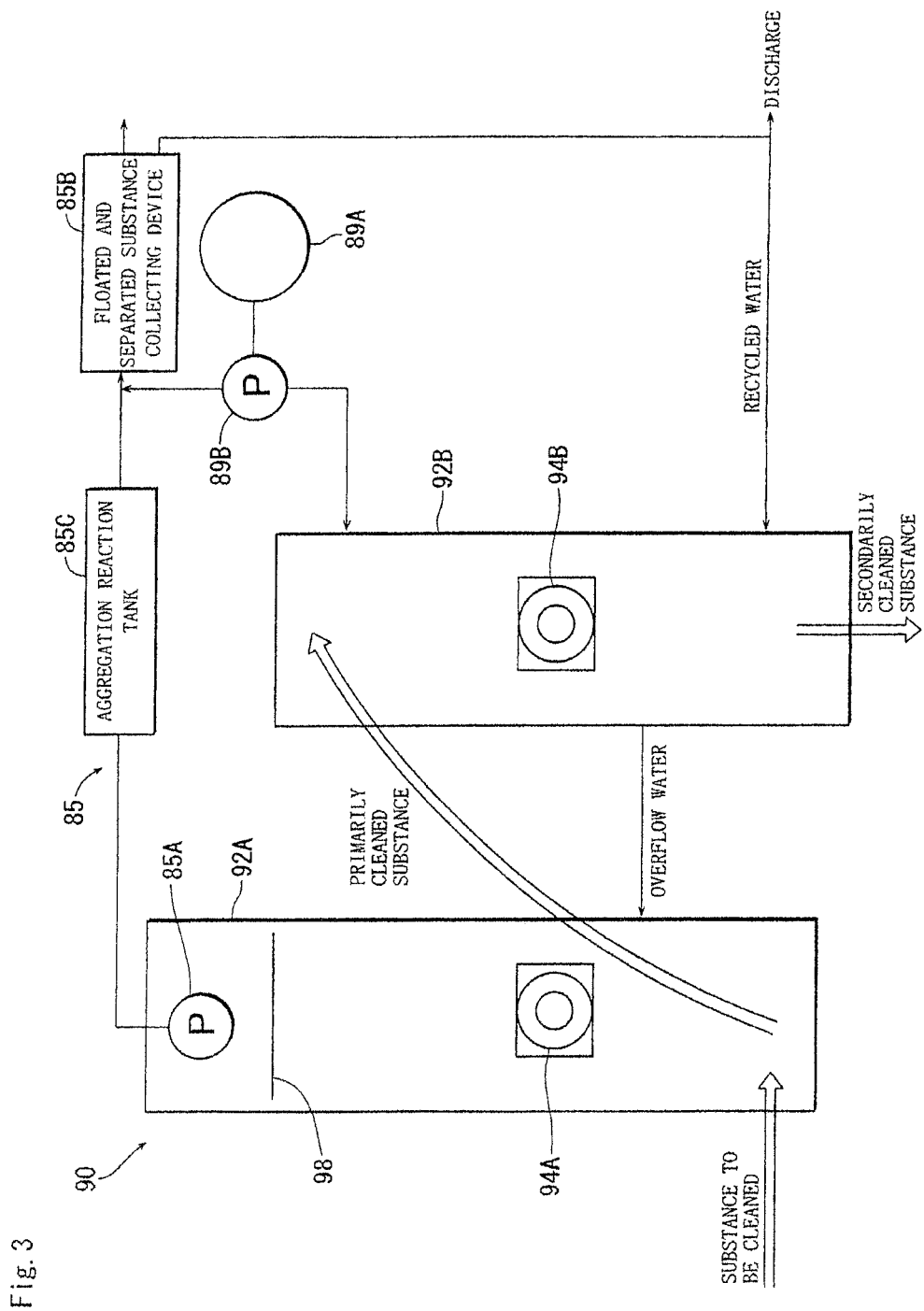
FIG. 3 is a plan view schematically showing a modified example of the ultrafine bubble cleaning apparatus.

FIGS. 2 and 3 show an ultrafine bubble cleaning apparatus 90 as a modified example capable of performing the continuous processing. The ultrafine bubble cleaning apparatus 90 is configured such that the reservoir includes a first small reservoir 92A and a second small reservoir 92B that are arranged in parallel and elongated, the substance to be cleaned is primarily cleaned at the first small reservoir 92A, then transferred to the second small reservoir 92B, and secondarily cleaned (rinsed) there, and the ultrafine bubble-containing liquid for cleaning is allowed to flow into the first small reservoir 92A after the secondary cleaning at the second small reservoir 92B to be used for the primary cleaning.

Specifically, in the ultrafine bubble cleaning apparatus 90, the primary cleaning is performed at the first small reservoir 92A, the secondary cleaning is performed at the second small reservoir 92B, and the ultrafine bubble-containing liquid during the secondary cleaning is supplied to the second small reservoir 92B from the tank 89A through the pump 89B. In the ultrafine bubble cleaning apparatus 90 in which a primarily cleaned substance has been rinsed (secondarily cleaned), the ultrafine bubble-containing liquid is supplied to the first small reservoir 92A as overflow water, the substance to be cleaned loaded by the substance-to-be-cleaned loading device 87 is primarily cleaned and discharged by the supernatant discharge device 85. Since the ultrafine bubble-containing liquid and the substance to be cleaned are processed in a so-called countercurrent cleaning mode, the substance is efficiently cleaned.

In the ultrafine bubble cleaning apparatus 90, the same reference numerals in FIG. 1 are given to the same parts as components in the ultrafine bubble cleaning apparatus 80 as shown in FIG. 1, and a description thereof is omitted.

As shown in FIG. 2, the first and second small reservoirs 92A and 92B are ponds dug in the ground. As the substance-to-be-cleaned loading device 87, a dump trunk is used. As the sedimentation extraction device 86 or a device for extracting a sediment after the primary cleaning in the first small reservoir 92A and loading the sediment into the second small reservoir 92B that is adjacent to the first small reservoir 92A, a power shovel is used. The power shovel is used not only for shifting the substance to be cleaned in the ponds but also for stirring.

As shown in FIG. 2, in order to return scattering water during an operation and drips during draining of temporarily placed soil after cleaning to the reservoir, a water permeable crushed stone subgrade 95 is provided within a range of motion of the above-described power shovel and dump trunk. Reference numeral 97 in FIG. 2 shows an overflow path in which a cleaning liquid is allowed to flow to the first small reservoir 92A when the liquid level of the second small reservoir 92B is constant. Reference numeral 98 in FIG. 3 shows a breakwater that is disposed so as to surround the pump 85A on a side of loading the substance to be cleaned and a baffle plate for preventing the inflow of a large amount of bubbles in the first small reservoir 92A.

Before the floated and separated substance collecting device 85B, an aggregation reaction tank 85C in which a flocculant for capturing fine particles contained in supernatant water from the first small reservoir 92A is added is provided.

Next, a process of cleaning soil and sand using the ultrafine bubble-containing water by the ultrafine bubble cleaning apparatus 90 described above will be described with reference to FIG. 4.

At Step 201, the ultrafine bubble-containing liquid (hereinafter referred to as cleaning liquid) is poured into the second small reservoir 92B.

When the liquid surface in the second small reservoir 92B is at a constant level, this cleaning liquid passes through the overflow path 97 and is poured into the first small reservoir 92A (see Step 101).

At Step 202, an overflow liquid (overflow cleaning liquid) is poured into the first small reservoir 92A through the overflow path 97 while the cleaning liquid is poured.

At Step 102, the substance to be cleaned is loaded into the first small reservoir 92A by substance-to-be-cleaned loading device 87 while the cleaning liquid is stirred.

At the next Step 103, while the overflow cleaning liquid from the second small reservoir 92B is poured into the first small reservoir 92A, it is stirred by a first stirring device 94A, and the cleaning liquid after primary cleaning is discharged by the supernatant discharge device 85.

At Step 102, the cleaning liquid may be stirred also during loading of the substance to be cleaned not only by the first stirring device 94A but also by the substance-to-be-cleaned loading device 87.

At Step 104, while the substance to be cleaned is loaded, the cleaned substance after the primary cleaning is extracted by the power shovel from an end portion of the first small reservoir 92A on a side opposite to the side of loading the substance. Then, the power shovel is traveled on the water permeable crushed stone subgrade 95, and the cleaned substance is loaded into one end of the second small reservoir 92B as a substance to be cleaned for secondary cleaning (see Step 203).

At Step 203, the substance to be cleaned after being rinsed is extracted by the power shovel.

Operations of Steps 102 to 103, 104, 202, and 203 described above are repeated. When the operations are stopped or cleaning of the substance to be cleaned is completed, all the operations are ended (see Steps 105 and 204).

Figure 4:
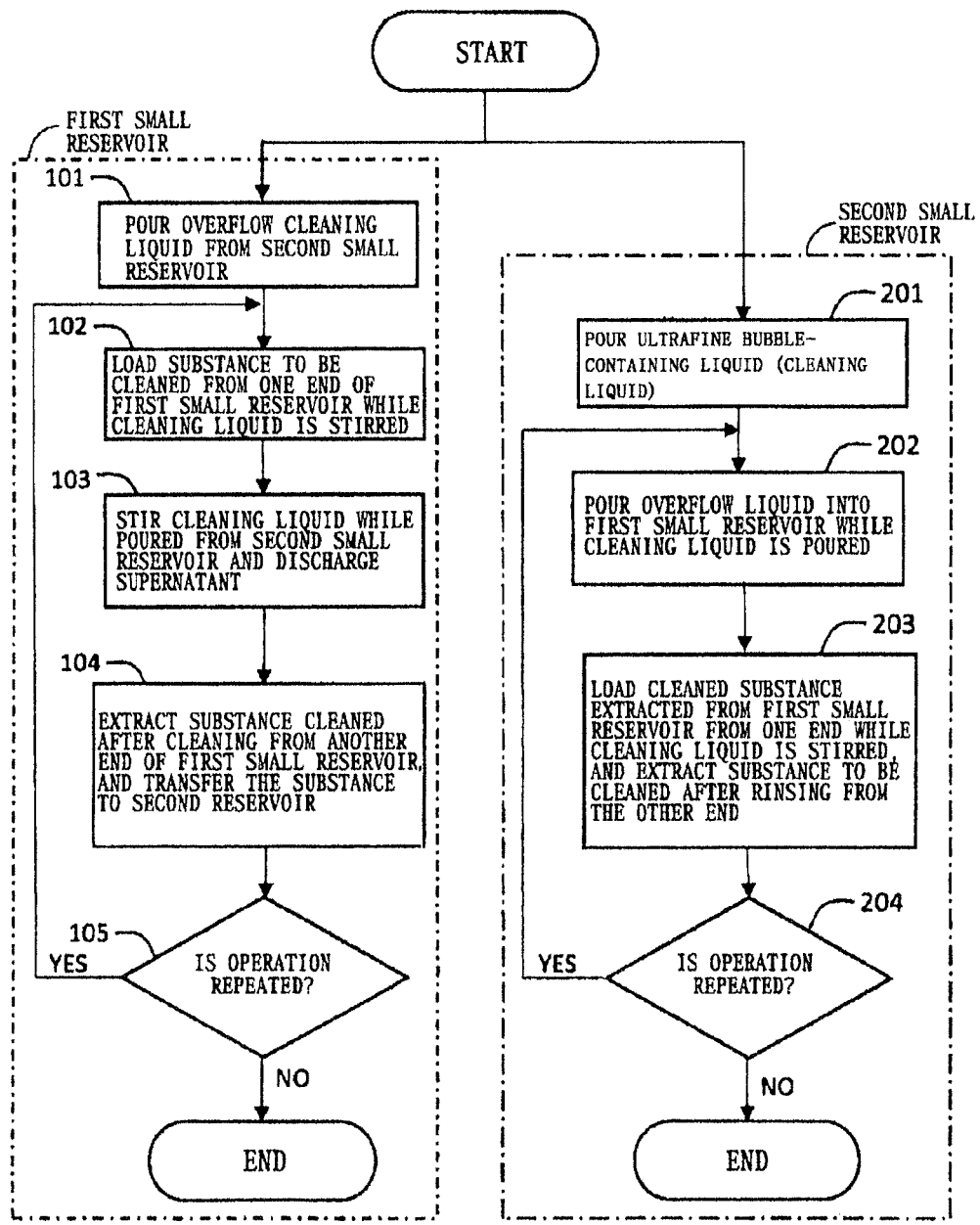
FIG. 4 is a flow chart showing a process of cleaning a substance to be cleaned by the modified example.

In FIG. 4, details of description of the aggregation reaction tank 85C constituting the supernatant discharge device 85 and the floated and separated substance collecting device 85B are omitted.

When a subject to be cleaned according to the present invention is not solid, for example, when from raw water in which fine droplets of an organic substance such as crude oil and insulating oil are dispersed, the fine droplets are separated, the raw water is poured into the reservoir 82 from the substance-to-be-cleaned loading device 89 in the ultrafine bubble cleaning apparatus 80 of FIG. 1, and the sedimentation extraction device 86 is not used.

The ultrafine bubble-containing water is poured into the raw water in the reservoir 82, ultrafine bubbles are adhered to the fine droplets by stirring by the stirring device 84, and the fine droplets are floated and separated from the raw water due to the buoyancy.

Thus, the organic substance is adhered to bubbles. When the bubbles are ultrafine bubbles, the bubbles are very likely to come into contact with the fine droplets dispersed in the raw water. Thus, the ultrafine bubbles are allowed to be adhered to most of the fine droplets, and as a result, the fine droplets can be floated and separated from the raw water due to the buoyancy of the ultrafine bubbles.

The above-described embodiment is related to cleaning of soil and sand containing radioactive cesium. However, the present invention is not limited to the embodiment. The subject to be cleaned may be fallen leaves, rubble, boards, or sheets, in addition to soil, sand, and stone.

A subject to be cleaned and collected is applied to a case where fine particles as a waste material, for example, an ore and a fragment with metal micro particles adhered are cleaned, and the metal micro particles that cannot be conventionally collected is cleaned off and collected.

Second Embodiment

Next, a dissolved air floatation apparatus 100 according to a second embodiment using the ultrafine bubble-containing liquid will be described in detail with reference to FIGS. 5 to 9.

Figure 5:
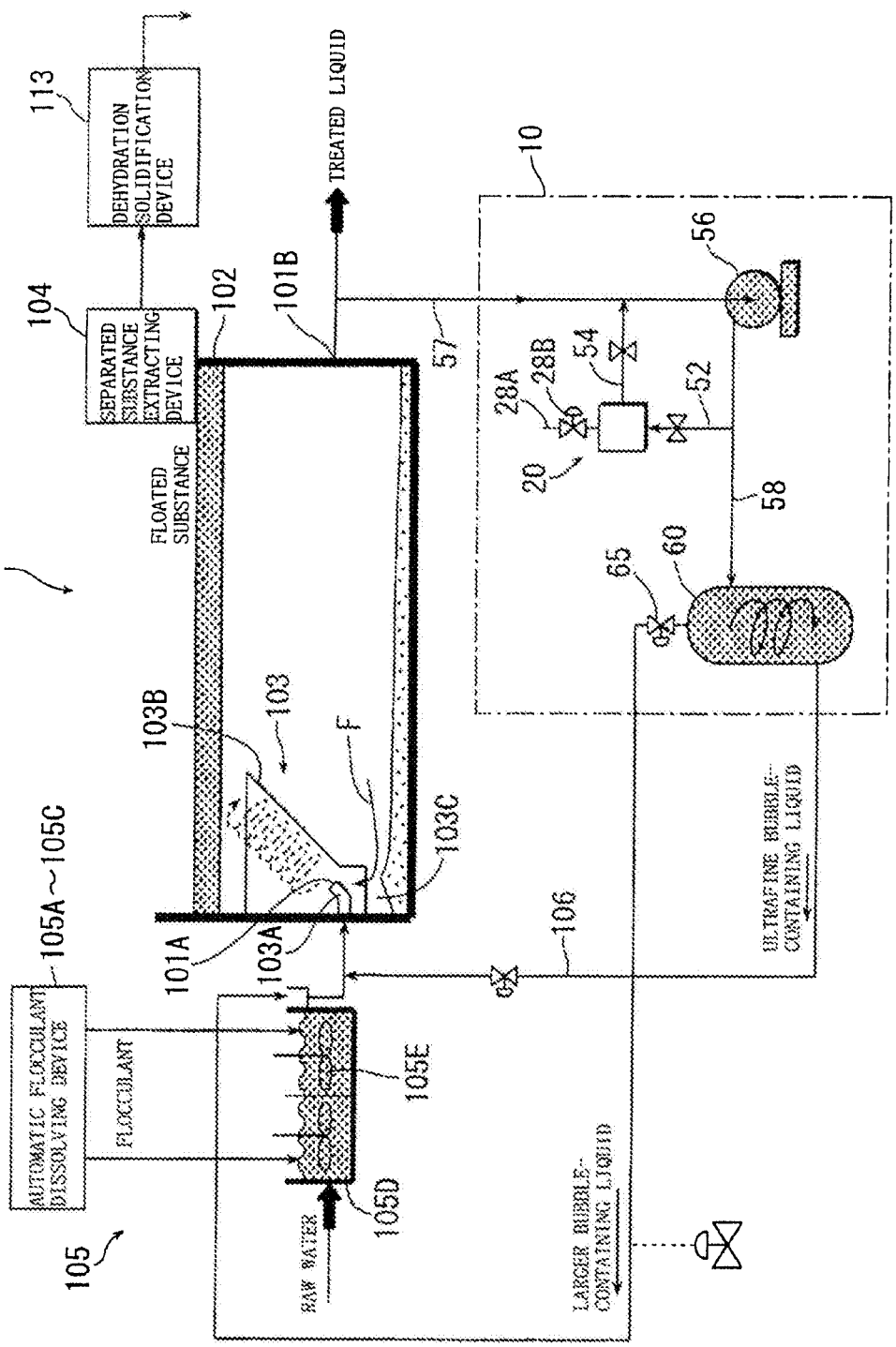
FIG. 5 is a pipe line view schematically showing a dissolved air floatation apparatus according to a second embodiment of the present invention.

As shown in FIG. 5, the dissolved air floatation apparatus 100 according to the second embodiment includes a dissolved air floatation tank 102 provided with an inlet 101A at one end. In the dissolved air floatation apparatus 100, the ultrafine bubble-containing liquid is mixed with a raw liquid (for example, radioactive substance and contaminated water) as a subject to be cleansed, and the mixed liquid is poured into the dissolved air floatation tank 102 from the inlet 101A. A suspended substance and a dissolved component in the raw liquid are adsorbed on an interface of ultrafine bubbles, and caused to be floated, thereby being separated from the raw liquid and extracted. In addition, the remaining raw liquid is discharged as a treated liquid.

The dissolved air floatation apparatus 100 has a circulating device 103 that circulates the mixed liquid of the raw liquid and the ultrafine bubble-containing liquid in the dissolved air floatation tank 102, and a separated substance extracting device 104 that extracts scum floated on a liquid surface of the ultrafine bubble-containing liquid in the dissolved air floatation tank 102.

Figure 14:
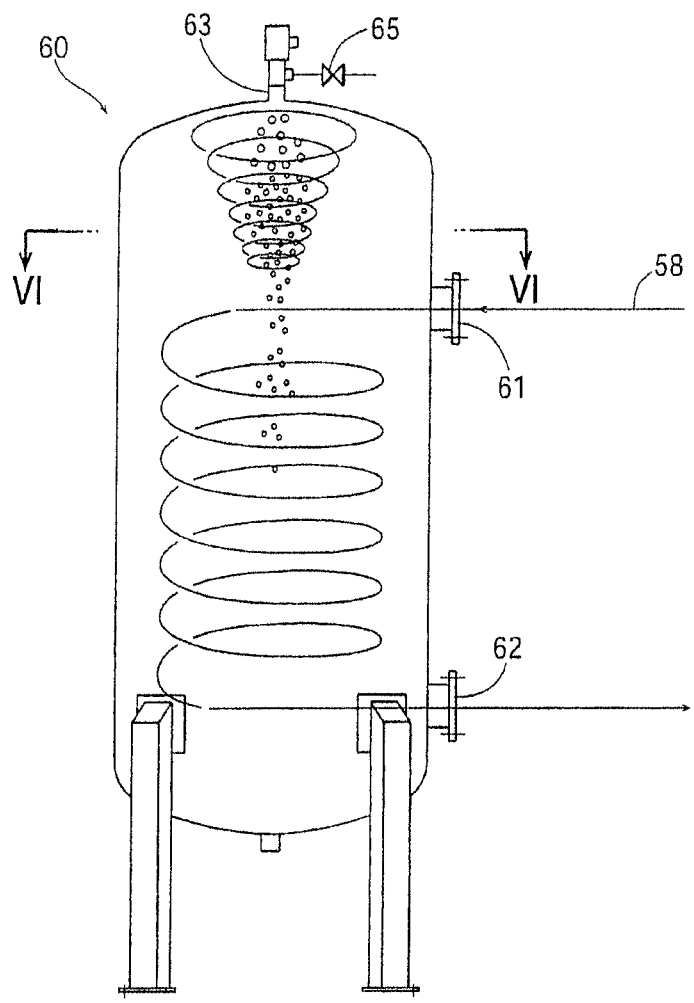
FIG. 14 is a front view partially including a cross-sectional view, showing a device for separating a bubble-containing liquid that constitutes part of the ultrafine bubble-containing liquid production device.

The circulating device 103 is composed of a swirling discharge pipe 103A, a swirling flow guide 103B, and a gap 103C. The swirling discharge pipe 103A is provided on an end portion (in the drawing, left end portion) of the dissolved air floatation tank 102 so as to be projected. As shown in FIG. 14 on an enlarged scale, a tip of the swirling discharge pipe 103A is curved diagonally upward, and a tip opening thereof serves as the inlet 101A. The swirling discharge pipe 103A has a curved pipe shape with which the mixed liquid of the raw liquid and the ultrafine bubble-containing liquid is jetted diagonally upward, and is configured to jet the mixed liquid as a swirling flow by a fixed fin in the dissolved air floatation tank 102.

The swirling flow guide 103B surrounds the swirling discharge pipe 103A, and is a cylindrical body that guides a swirling flow discharged from the swirling discharge pipe 103A diagonally upward and has an opening at the top and bottom. The swirling flow guide 103B is disposed so as to guide a swirling flow jetted from the inlet 101A diagonally forward. The gap 103C is provided between a lower end opening of the swirling discharge pipe 103A and the bottom of the dissolved air floatation tank 102 so that the swirling flow circulated in the dissolved air floatation tank 102 flows from the lower end opening into the swirling discharge pipe 103A.

The dissolved air floatation apparatus 100 has the separated substance extracting device 104 for extracting scum floated on the liquid surface in the dissolved air floatation tank 102. The remaining liquid after the floated scum was extracted is discharged as a treated liquid from an discharge opening 101B. The discharge opening 101B is connected to a pressurization pump 56 through an inflow pipe 52 in an ultrafine bubble-containing liquid production device 10.

To the treated liquid from the above-described dissolved air floatation apparatus 100, ultrafine bubbles are added by the ultrafine bubble-containing liquid production device 10, and the liquid is separated into a liquid containing larger bubbles and a liquid containing ultrafine bubbles by a bubble-containing liquid separation device 60. The ultrafine bubble-containing liquid is pressurized and passes through a pressurized liquid pipe 106, and is added to raw water, in which a flocculant has been added, discharged from a flocculant reaction tank device 105 is added. The ultrafine bubble-containing liquid then flows as the swirling flow from the inlet 101A into the dissolved air floatation tank 102.

The gap 103C is formed between the swirling flow guide 103B and the bottom face of the dissolved air floatation tank 102. The liquid in the dissolved air floatation tank 102 can flow from the lower end opening of the swirling flow guide 103B therethrough. When the dissolved air floatation apparatus 100 is operated for a predetermined time or more, the sedimentation isolates are settled on the bottom face of the dissolved air floatation tank 102. The sedimentation isolates are also sucked from the gap 103C to the swirling flow guide 103B, and circulated in the dissolved air floatation tank 102 together with the swirling flow from the swirling discharge pipe 103A.

Figure 6:
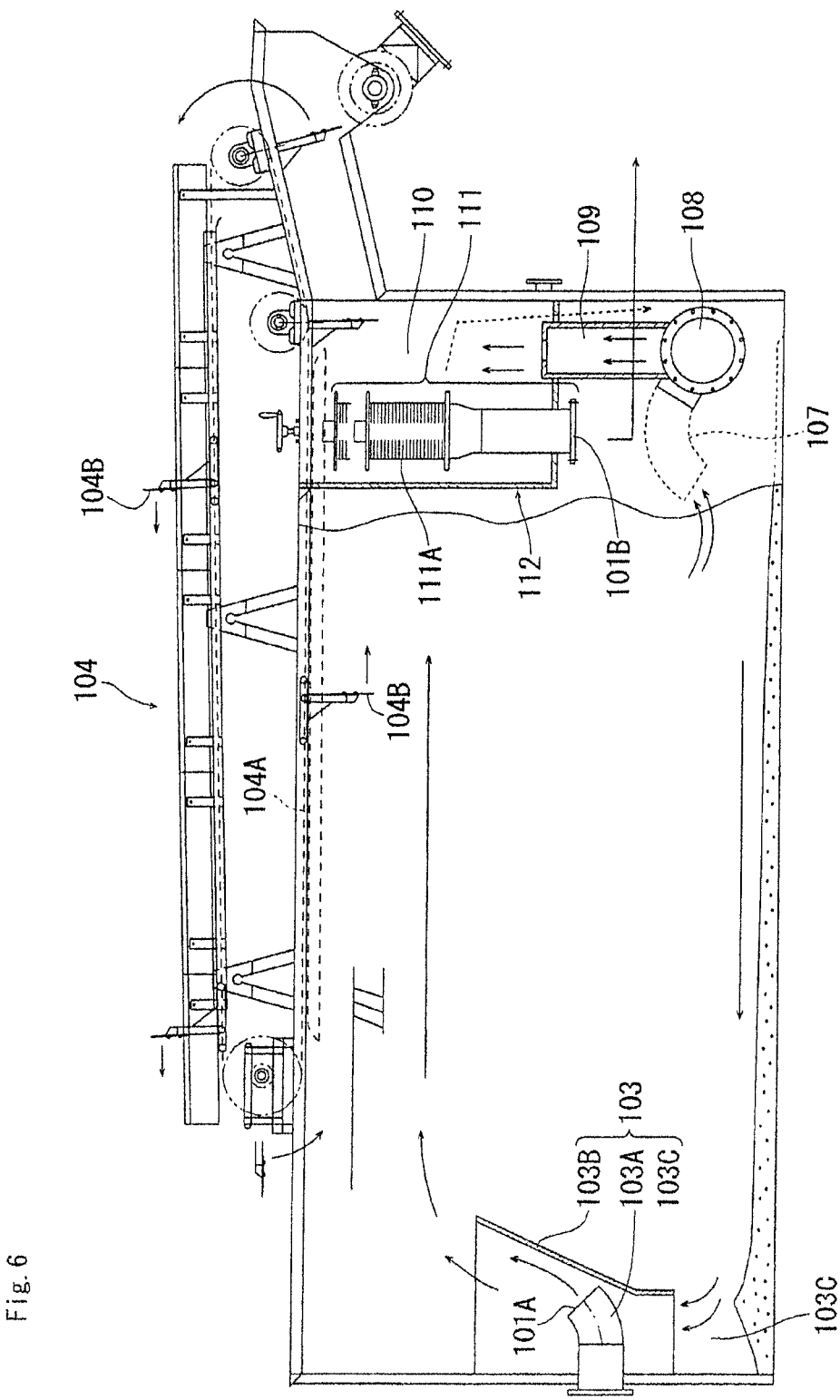
FIG. 6 is a front view partially including a cross-sectional view, showing the dissolved air floatation apparatus.
Figure 7:
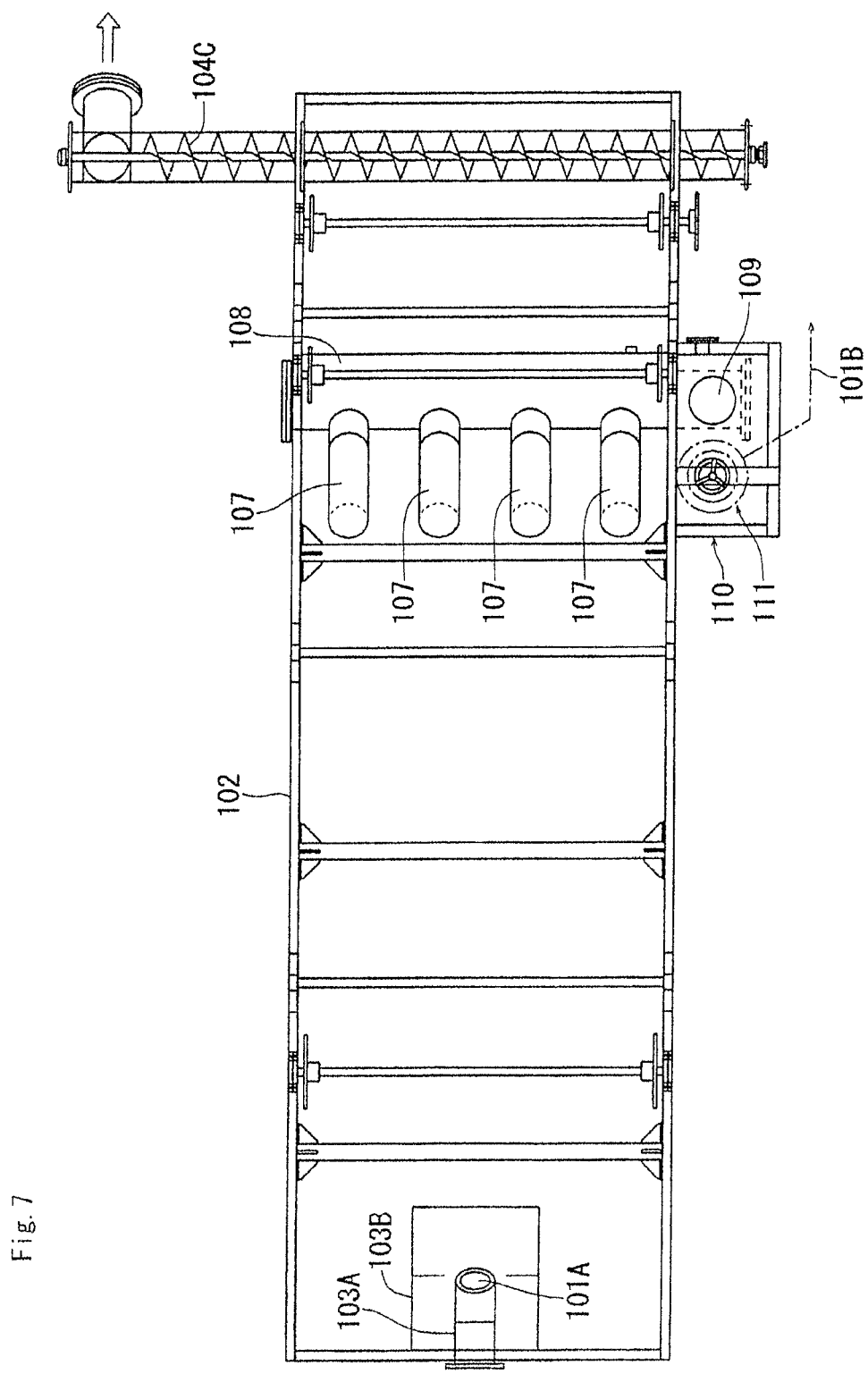
FIG. 7 is a plan view of the dissolved air floatation apparatus.
Figure 8:
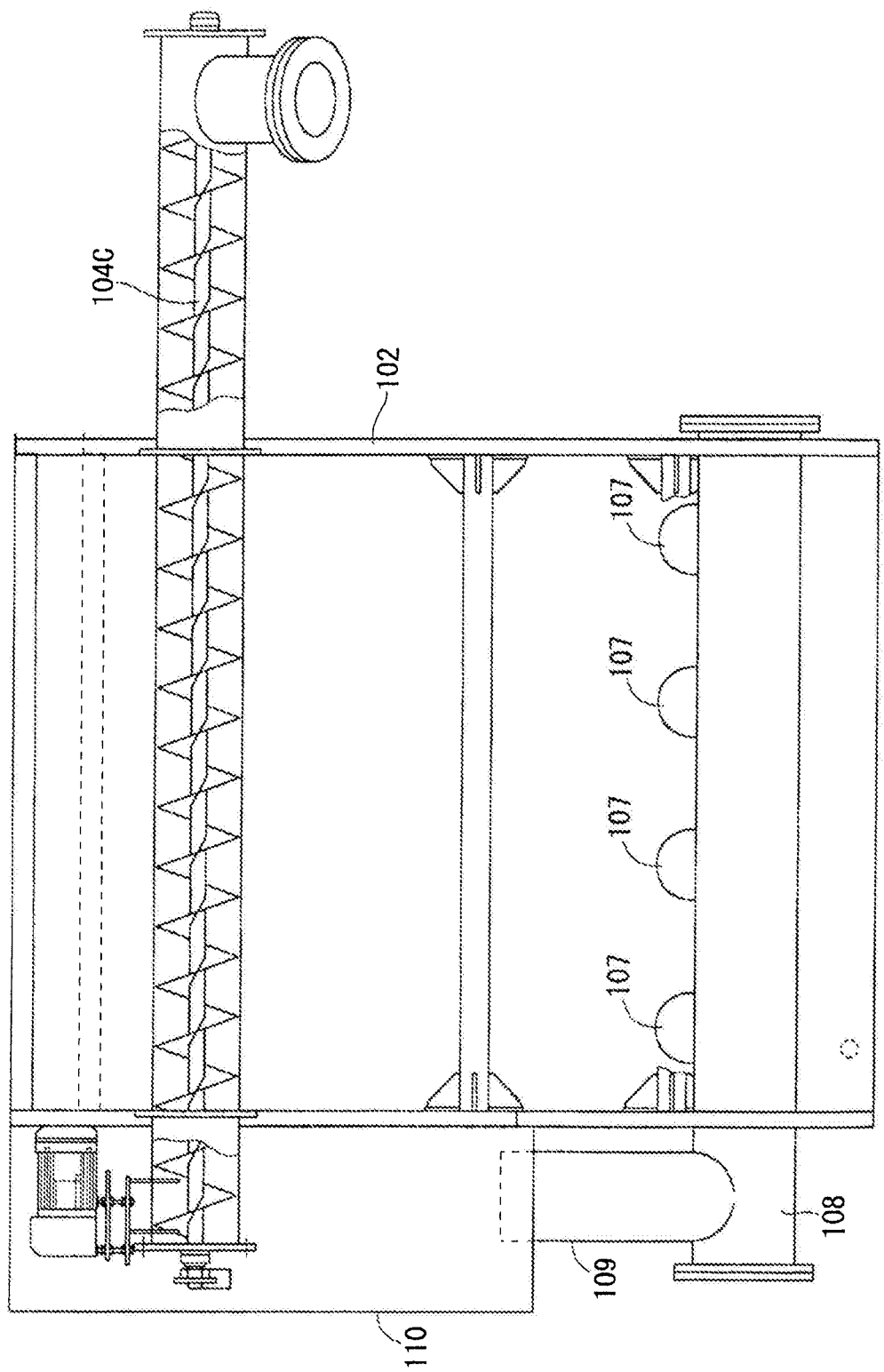
FIG. 8 is a side view of the dissolved air floatation apparatus.

As shown in FIGS. 6 to 8, at an end portion of the dissolved air floatation tank 102 opposite to the circulating device 103, a discharge control device 112 is provided. The discharge control device 112 includes a plurality of suction pipes 107 (herein, 4 pipes) that collects the liquid in the dissolved air floatation tank 102, a single horizontal collecting pipe 108 that is connected to the suction pipes 107 on a discharge side, a riser pipe 109 that is vertically connected to the collecting pipe 108 outside a side wall of the dissolved air floatation tank 102 and guides the liquid collected through the collecting pipe 108 upward, a subtank 110 formed on an outer surface of the dissolved air floatation tank 102 so as to surround an upper end of this riser pipe 109, and a level control pipe 111 that is provided in this subtank 110 and has a suction opening 111A that is movable upward and downward on the upper end within a certain range and a discharge opening 101B on the lower end.

The separated substance extracting device 104 includes an endless chain 104A and a plurality of skimmers 104B attached to the endless chain 104A at certain intervals. The separated substance extracting device 104 is configured such that the skimmers 104B sweep the scum floated on the liquid surface in the dissolved air floatation tank 102 from left to right in FIG. 6 to collect the scum at a position of the outer side of the dissolved air floatation tank 102.

As shown in FIG. 7, the separated substance extracting device 104 includes a feed screw 104C for transporting the floated scum collected by the skimmers 104B upward in FIG. 7 and discharging the scum.

Figure 9:
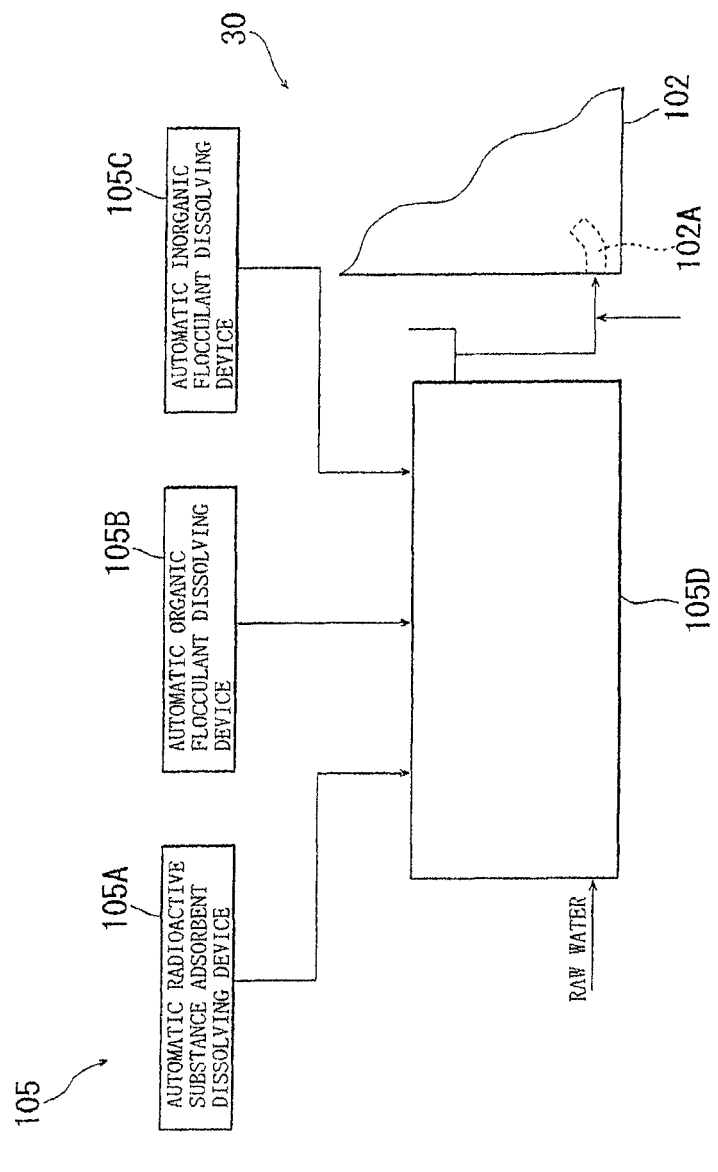
FIG. 9 is a block diagram schematically showing a flocculant reaction device in the dissolved air floatation apparatus.

Next, the flocculant reaction tank device 105 will be described with reference to FIGS. 5 and 9.

The flocculant reaction tank device 105 has a flocculant reaction tank 105D to which a flocculant dissolved in each of an automatic radioactive substance adsorbent dissolving device 105A, an automatic organic flocculant dissolving device 105B, and an automatic inorganic flocculant dissolving device 105C is supplied. In the flocculant reaction tank device 105, the flocculant is dissolved and mixed in raw water. Reference numeral 105E in FIG. 5 shows a stirring device 105E for favorably mixing the flocculant and raw water.

The liquid containing larger bubbles from the bubble-containing liquid separating device 60 shown in FIG. 5 is sent to a sending side of the flocculant reaction tank 105D, and is mixed in raw water in which the flocculant is mixed at the sending side. A radioactive substance adsorbent is, for example, a zeolite slurry or Prussian blue. The organic flocculant is an anionic, nonionic, cationic, or amphoteric organic polymer flocculant. The inorganic flocculant is iron chloride, aluminum sulfate, polyaluminum chloride, or the like.

In the dissolved air floatation apparatus 100 according to the second embodiment, the ultrafine bubble-containing liquid is poured into raw water (for example, radiation-contaminated water) in which the flocculant is dissolved and added. After that, a helical flow that is upward from a left end to right in FIG. 5 is formed by the swirling flow guide 103B.

The gap 103C is formed between a lower end of the swirling flow guide 103B and the bottom of the dissolved air floatation tank 102. The liquid in the dissolved air floatation tank 102 is rolled together by the above-described swirling flow to form a large circulating flow in the dissolved air floatation tank 102.

In this circulating flow, the flocculant can incorporate a trace amount of particles of, for example, cesium that accidentally comes into contact therewith. However, when the ultrafine bubbles are not present, the flocculant can hardly incorporate the particles.

The ultrafine bubbles always allow the floated and separated substance to partially come into contact with the flocculant due to the area of interface of the ultrafine bubbles, and to be incorporated as a coagulated floc that is electrically neutralized. As a result, most of cesium ions form a stably floated substance. The substance is floated on the liquid surface as the floated scum.

The floated scum is collected at a right end in FIG. 5 by the skimmers 104B driven by the endless chain 104A in the separated substance extracting device 104, and is further collected upward in FIG. 7 by the feed screw 104C and discharged outside.

The discharged floated scum is dehydrated and solidified by a dehydration solidification device 113, and put in a container. A liquid generated by the dehydration is returned to the dissolved air floatation tank 102.

In the second embodiment described above, the dissolved air floatation apparatus 100 has the flocculant reaction tank device 105. However, the present invention is not limited to the embodiment, and is also applied to an embodiment in which the flocculant reaction tank device 105 is not provided.

From contaminated water further containing a slight amount of oil, the dissolved air floatation tank could separate the oil as a floated and separated substance to obtain agricultural water or potable water. In this case, as the flocculant, organic and inorganic flocculants are used.

The ultrafine bubble-containing liquid used in ultrafine bubble cleaning in the first and second embodiments is produced by the ultrafine bubble-containing liquid production device 10. As shown in FIGS. 10 to 15, the ultrafine bubble-containing liquid production device 10 is configured to have a gas-liquid mixing unit 20, a nozzle 30 provided in the gas-liquid mixing unit 20 (see FIG. 11), a swirling flow forming device 40 (see FIGS. 12 and 13), a pressurized liquid supply system 50, and the bubble-containing liquid separation device 60 (see FIGS. 14 and 15).

Figure 11:
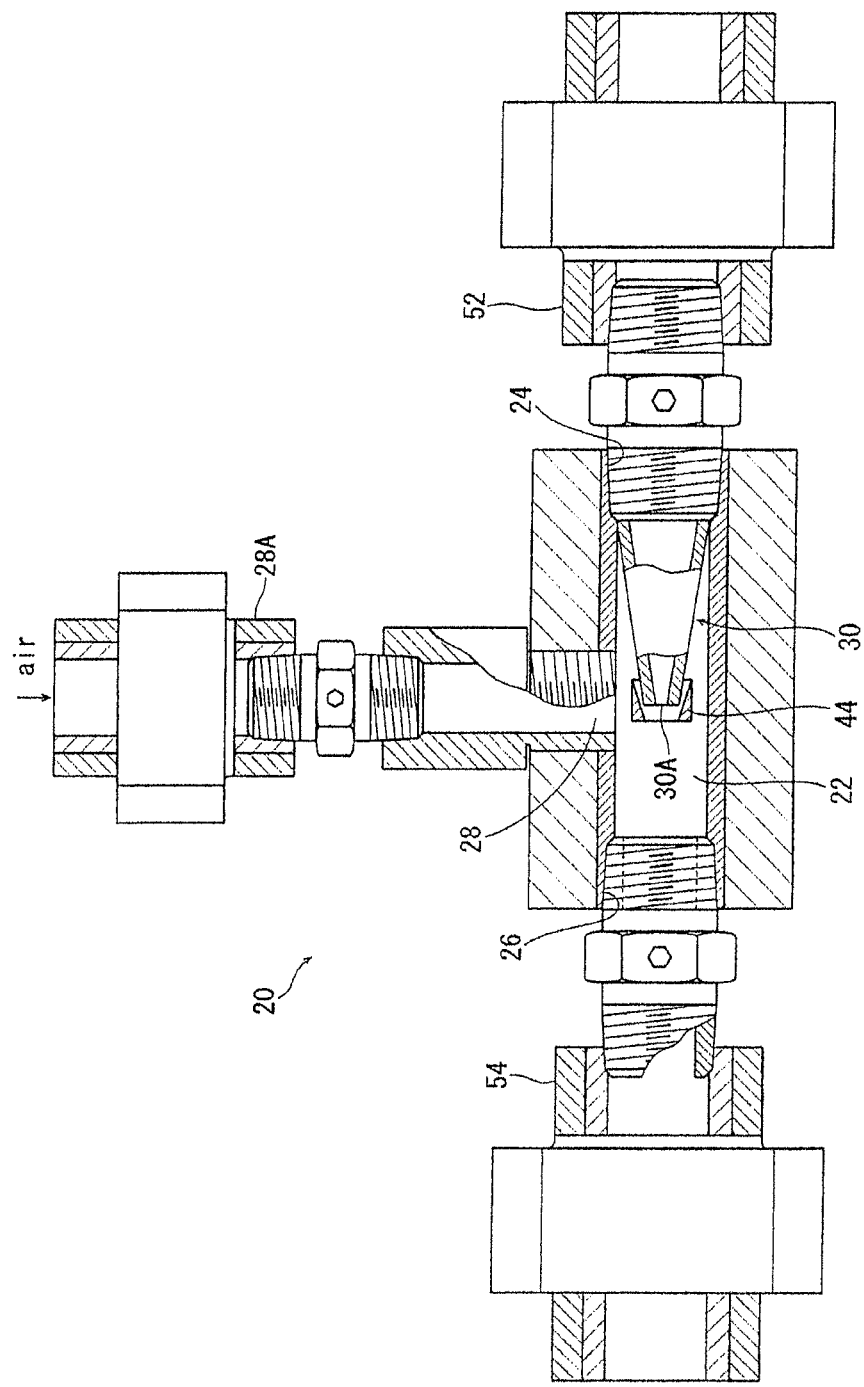
FIG. 11 is a front view partially including a cross-sectional view, showing a gas-liquid mixing unit in the production device on an enlarged scale.

As shown in FIG. 11, the gas-liquid mixing unit 20 is configured to include a liquid flow path 22 capable of passing a liquid, a liquid inflow port 24 provided at one end (in FIG. 11, right end) of the liquid flow path 22, a bubble-containing liquid discharge port 26 provided at the other end (in FIG. 11, left end), and an ejection port 28 that is formed between the inflow port 24 and the discharge port 26 so that the gas can flow from a side (in FIG. 11, upper portion) to the liquid flow path 22.

The nozzle 30 in which a tip 30A is opened at a position of the ejection port 28 for jet of a liquid is provided so as to be projected from the inflow port 24 in the liquid flow path 22.

Figure 12:
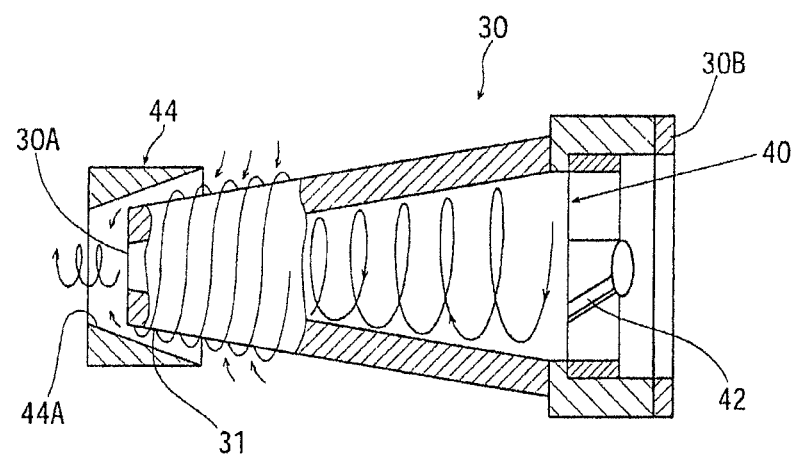
FIG. 12 is a cross-sectional view showing a nozzle of the gas-liquid mixing unit on an enlarged scale.
Figure 13:
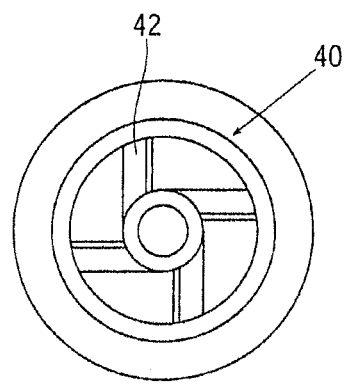
FIG. 13 is a side view showing a device for making a swirling flow by a fixed blade mounted on the nozzle.

As shown in FIGS. 12 and 13 on an enlarged scale, the swirling flow forming device 40 including four fixed blades 42 in a circumferential direction is inserted in the nozzle 30 from a proximal end 30B of the nozzle 30 and fixed in the inside of the nozzle 30.

Herein, the liquid that forms a swirling flow by the swirling flow forming device 40 during passing through the nozzle 30 is jetted from the tip 30A as the swirling flow. The position of the tip 30A of the nozzle 30 is determined so that a discharge flow of gas sucked out from the ejection port 28 under a negative pressure formed by the swirling flow from the tip 30A inflows into the swirling flow.

The nozzle 30 includes a gas guide device 44 configured by a cylindrical guide surrounding the tip 30A with a space therebetween.

The gas guide device 44 is configured to guide the discharge flow of gas sucked from the ejection port 28 into the liquid flow path 22 to inflow into the swirling flow of liquid jetted from the tip 30A of the nozzle 30.

More particularly, the nozzle 30 has a tapered shape narrowed toward its tip. The gas guide device 44 has a tapered inner circumferential surface 44A that is tapered in a liquid jet direction, and is attached to the nozzle 30 with a screw (not illustrated) so that a middle section in an axial direction of the tapered inner circumferential surface 44A is disposed at a position of the tip 30A of the nozzle 30.

As shown in FIG. 11, an inflow pipe 52 is threaded and connected to the inflow port 24 of the gas-liquid mixing unit 20. A discharge pipe 54 is threaded and connected to the discharge port 26, similarly to the inflow pipe 52. Further, a gas introduction pipe 28A is threaded and connected to the ejection port 28. A gas introduction amount controlling valve 28B is provided in the middle of the gas introduction pipe 28A.

The pressurized liquid supply system 50 includes the inflow pipe 52, the discharge pipe 54, the pressurization pump 56 capable of supplying a pressurized liquid containing fine bubbles to the inflow pipe 52, a raw liquid supply pipe 57 that is connected to a suction side of the pressurization pump 56 and supplies a liquid to be mixed with a gas, and a transfer pipe 58 that is connected to a discharge side of the pressurization pump 56 and transfers a pressurized liquid.

Figure 10:
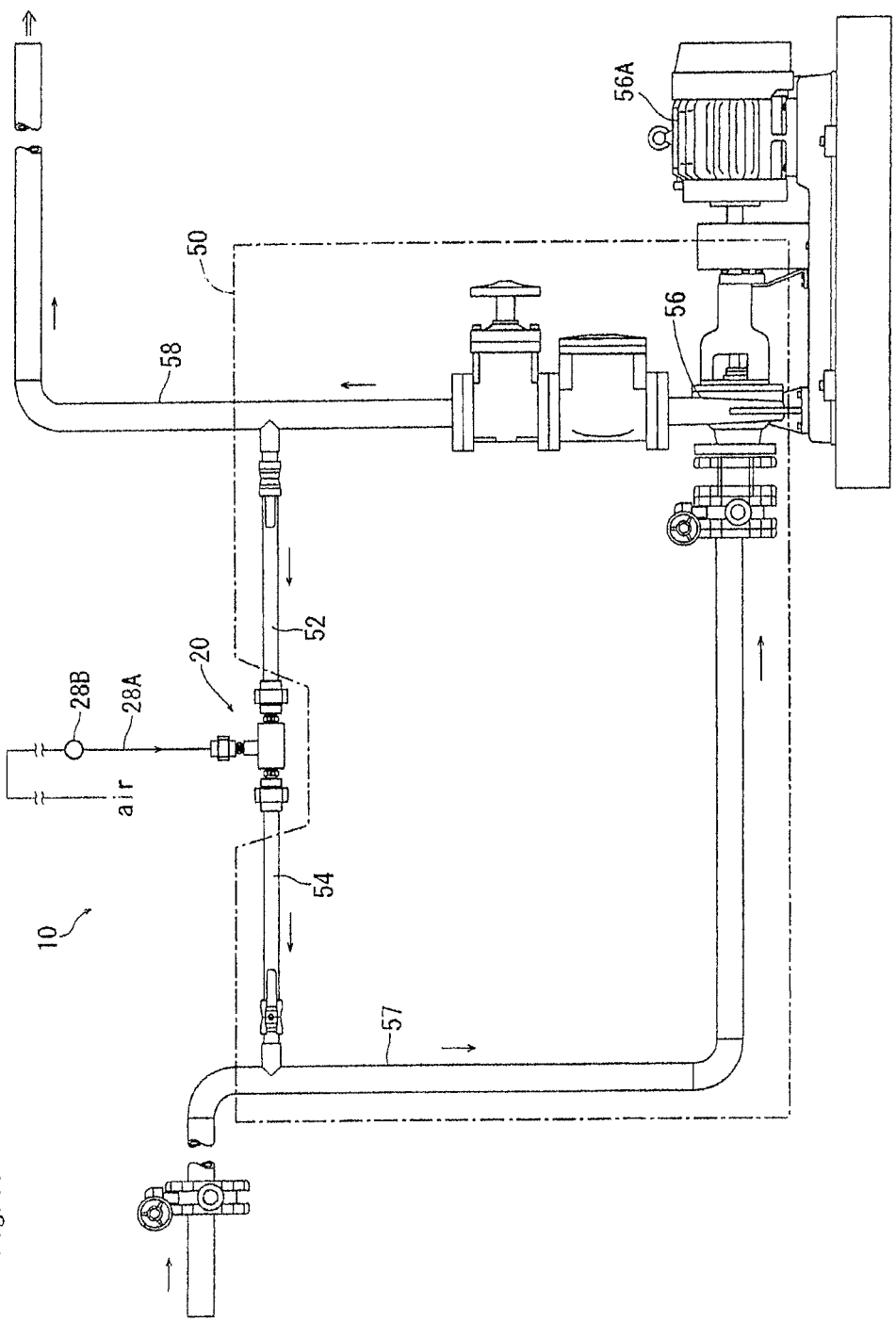
FIG. 10 is a front view showing an ultrafine bubble-containing liquid production device used in the first and second embodiments of the present invention.

The inflow pipe 52 is connected to the middle of the transfer pipe 58, and the discharge pipe 54 is connected to the middle of the raw liquid supply pipe 57. The pressurized liquid supply system 50 is configured so that part of the ultrafine bubble-containing liquid generated at the gas-liquid mixing unit 20 is passed through the discharge pipe 54, the raw liquid supply pipe 57, the pressurization pump 56, the transfer pipe 58, and the inflow pipe 52, and returned to the inflow port 24 of the gas-liquid mixing unit 20. Reference numeral 56A in FIG. 10 shows a motor for driving the pressurization pump 56.

Figure 15:
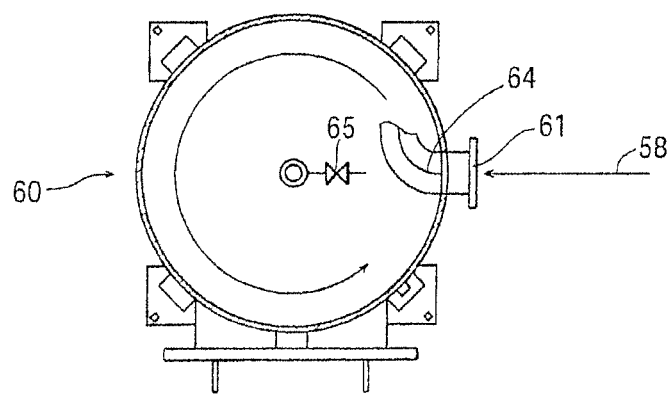
FIG. 15 is a cross-sectional view taken along line XV-XV of FIG. 14.
Figure 16:
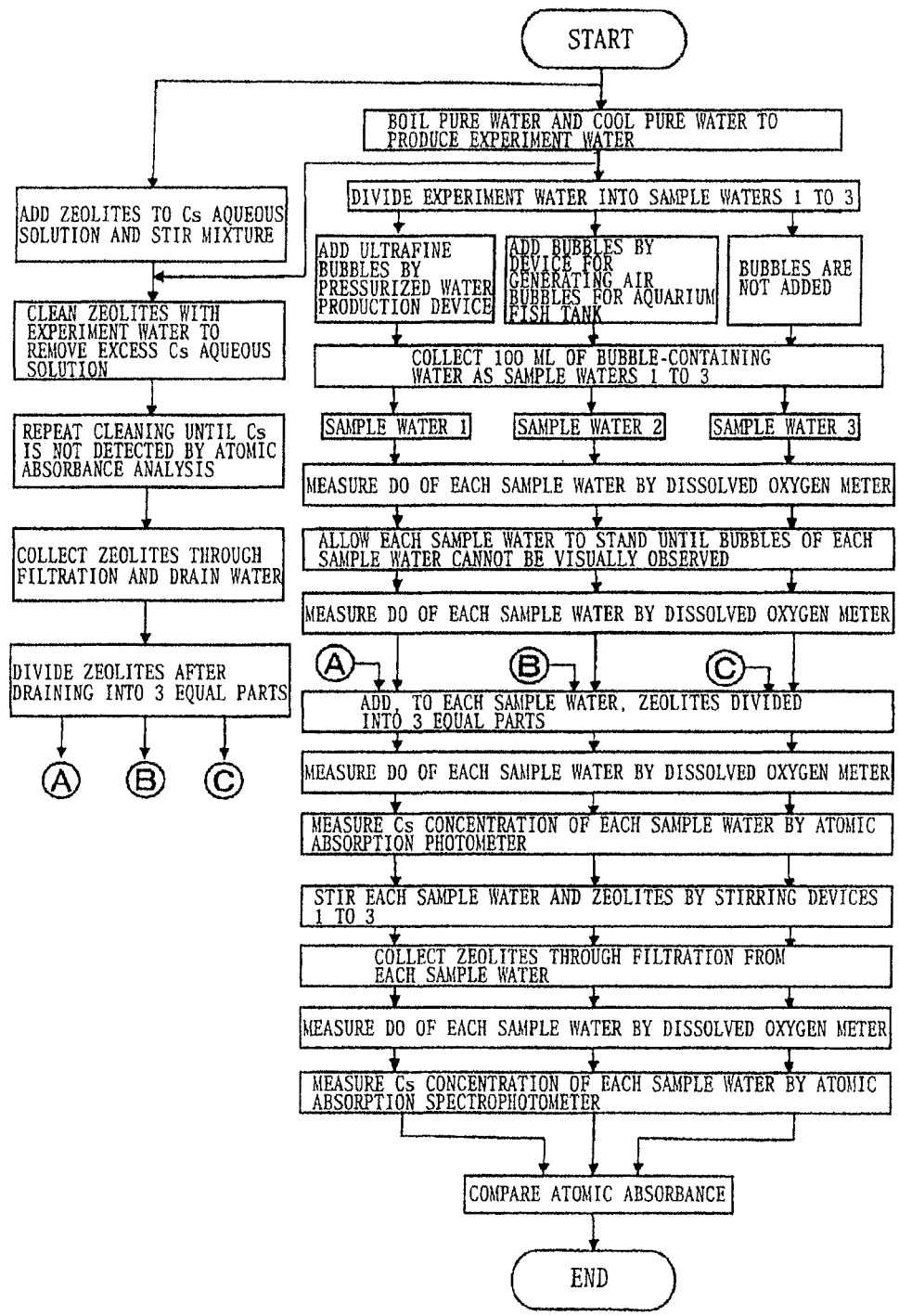
FIG. 16 is a flow chart showing another example of a method for confirming the presence of ultrafine bubbles.

The transfer pipe 58 of the pressurized liquid supply system 50 is connected to the bubble-containing liquid separation device 60 shown in FIG. 14 or 15, and is configured to supply the ultrafine bubble-containing liquid under pressure to the bubble-containing liquid separation device 60.

The bubble-containing liquid separation device 60 includes a storage type pressurized liquid tank having a circular cross section. The bubble-containing liquid separation device 60 is configured to include a pressurized liquid inflow port 61 that is provided on an upper side face of the tank and into which the ultrafine bubble-containing liquid transferred through the transfer pipe 58 flows, a pressurized liquid discharge port 62 provided at a lower side face of the tank, a central liquid discharge port 63 provided at an upper end of the tank, and a swirling flow forming pipe 64 that is provided inside the pressurized liquid inflow port 61 and converts the flowing-in pressurized liquid into a downward swirling flow along the inner circumferential face of the tank.

As shown in FIG. 15, the swirling flow forming pipe 64 is configured to guide the pressurized liquid from the pressurized liquid inflow port 61 so that the pressurized ultrafine bubble-containing liquid that flows in a radial direction of the circular cross section of the tank flows counterclockwise along the inner circumferential face of the circular cross section of the tank into a helical flow that flows slightly diagonally downward.

The liquid flowing in from the pressurized liquid inflow port 61 is discharged outside the tank from the pressurized liquid discharge port 62 provided at the lower side face of the tank and the central liquid discharge port 63. Each discharge amount is controlled by a discharge amount controlling valve 65 that is provided near the central liquid discharge port 63.

The swirling flow forming pipe 64 converts the pressurized liquid flowing into the tank into a swirling flow. However, since the central liquid discharge port 63 is provided at a central position of the upper end face of the tank, the liquid at a center part of the swirling flow in the tank is discharged from the central liquid discharge port 63 and the liquid at an outside part of the swirling flow is discharged from the pressurized liquid discharge port 62.

Of the liquid in the tank, a part that contains ultrafine bubbles and has a relatively large specific gravity is concentrated outside of the swirling flow, and a part that contains bubbles larger than the ultrafine bubbles and has a relatively small specific gravity is concentrated to the central part of the swirling flow by the swirling flow. Therefore, of the liquid flowing into the tank, the part that contains the relatively large bubbles is discharged from the central liquid discharge port 63, and the rest contains more ultrafine bubbles and is discharged from the pressurized liquid discharge port 62. Accordingly, there is less opportunity of bringing the ultrafine bubbles into contact with the larger bubbles and including the ultrafine bubbles, and the ultrafine bubbles are unlikely to be broken.

Next, a process of producing the ultrafine bubble-containing liquid by the ultrafine bubble-containing liquid production device 10 described above will be described.

The raw liquid to be mixed with a gas is sucked from the raw liquid supply pipe 57, and sent under pressure from the transfer pipe 58 by the pressurization pump 56.

Part of the liquid in the transfer pipe 58 passes through the inflow pipe 52 and the inflow port 24 and reaches the gas-liquid mixing unit 20. The rest is brought to the pressurized liquid inflow port 61 of the bubble-containing liquid separation device 60.

The liquid flowing in from the inflow port 24 of the gas-liquid mixing unit 20 is jetted from the tip 30A of the nozzle 30 into the liquid flow path 22 while the liquid flows as a swirling flow by the swirling flow forming device 40 provided at the proximal end 30B of the nozzle 30. In a steady state after a certain period of time elapses after the jetting, the pressure in the gas-liquid mixing unit 20 is made higher than the exterior pressure, and is, for example, 2.5 to 6.0 kg/cm$^2$.

In addition to the velocity in a flow direction in the liquid flow path 22, the velocity component of swirling flow of the jetted liquid is larger. Therefore, the negative pressure applied to the ejection port 28 is 2 to 3 or more times that of a case where a liquid generally linearly flows. Accordingly, even when the pressure in the gas-liquid mixing unit 20 is higher than the exterior pressure, a gas can be reliably discharged from the ejection port 28.

The helical flow of the liquid jetted from the tip 30A of the nozzle 30 involves the liquid in the liquid flow path 22 and the gas from the ejection port 28 to form a helical flow.

The gas sucked from the ejection port 28 is involved as a helical flow along a tapered outer circumference surface 31 of the nozzle 30 between the outer circumference surface and a tapered inner circumference surface 44A of the gas guide device 44. In this case, the gas is strongly mixed in the helical flow of the liquid jetted from the nozzle 30.

In this process, occurrence and rupture of cavitation in the helical flow mixed with the gas are repeated. Every time they are repeated, bubbles formed from the gas rupture into small bubbles, which are ultrafine bubbles having a size of almost 100 nm or less, 30 nm or less, and furthermore 10 Å to 3 Å.

The liquid containing ultrafine bubbles passes through the discharge port 26 of the gas-liquid mixing unit 20 and the discharge pipe 54 and reaches the raw liquid supply pipe 57. From the raw liquid supply pipe 57, the liquid is sucked by the pressurization pump 56, and sent under pressure from the transfer pipe 58. Part of the sent pressurized liquid is supplied to the gas-liquid mixing unit 20 similarly to the above description. The occurrence and rupture of bubbles due to cavitation are repeated, and remaining large bubbles are also changed into smaller ultrafine bubbles.

The size of bubbles contained in the ultrafine bubble-containing liquid is mostly 100 nm or less. However, when the liquid is passed through the gas-liquid mixing unit 20 a plurality of times, the ratio of bubbles of 30 nm or less is increased. Bubbles of less than 10 Å and 3 Å or more, though not all, could be confirmed. For example, measurement can be performed as follows using synthetic zeolites in which the size of voids is designed to 3 Å or more in advance.

Magnesium and cesium cations were adsorbed on synthetic zeolites each having voids of 3 Å, 4 Å, 5 Å, 7 Å, and 10 Å, and repeatedly washed with pure water. When the amount of cations eluted from a filtrate was constant, the zeolites were mixed and stirred with water containing ultrafine bubbles. At this time, significant elution of the magnesium and cesium cations was confirmed.

Zeolites in which magnesium and cesium cations get into the voids sink in water as they are. When the zeolites were brought into contact with ultrafine bubble-containing water, the specific gravity of the synthetic zeolites was decreased, and floating could be confirmed. This is estimated to be because the ultrafine bubbles allow the magnesium and cesium cations in the voids of the synthetic zeolites to be discharged and get into the voids, in consideration of significant elution of the aforementioned magnesium and cesium cations. It should be noted that bubbles having a larger size than that of voids of zeolites cannot enter into the voids.

When the same process as described above was repeated, the present inventor could confirm that bubbles having a size of 3 Å or more to less than 10 Å were present in produced ultrafine bubble-containing water.

Herein, a reason of confirmation of the ultrafine bubbles having a size of less than 10 Å is as follows. When the ultrafine bubbles that are mixed in water have a size of less than 10 Å, the size is equal to or smaller than the wavelength of visible light, and the ultrafine bubbles that are transparent cannot be confirmed visually. Since such ultrafine bubbles and the synthetic zeolites with the pore diameters of 10 Å or less induced the aforementioned phenomenon, the size to be confirmed is determined to be less than 10 Å. Ultrafine bubbles having a size of 30 nm or less that cannot be conventionally measured are referred to as ultrafine bubbles.

According to an experiment in which the liquid was water and the gas was air, ultrafine bubbles containing bubbles having a size of less than 10 Å that could not visually confirmed could be dissolved at a rate of 15 to 20 L/min in an amount of ultrafine bubble-containing water discharged from an outlet of the transfer pipe 58 of 600 t/day to 1,250 t/day.

In the embodiment described above, the swirling flow of the liquid is applied to an ejector, and the gas-liquid mixing unit 20 in which the gas is sucked out is used. However, even in a general ejector having a structure of simply applying the straight flow of liquid to a port, ultrafine bubbles are slightly generated. Therefore, when the ultrafine bubbles are selected over time using the bubble-containing liquid separation device as described above or selected by providing the bubble-containing liquid separation device at many stages, a liquid containing a large amount of ultrafine bubbles can be produced.

The ultrafine bubble-containing liquid passes through the transfer pipe 58, and is supplied to the pressurized liquid inflow port 61 of the bubble-containing liquid separation device 60.

The bubble-containing liquid separation device 60 having a tank shape is always filled with the pressurized liquid supplied from the pressurized liquid inflow port 61, and the pressurized liquid is discharged outside in only an amount corresponding to the flow amount of the pressurized liquid from the central liquid discharge port 63 and the pressurized liquid discharge port 62.

The pressurized liquid that is supplied from the transfer pipe 58 through the pressurized liquid inflow port 61 to the pressurized liquid in the bubble-containing liquid separation device 60 flows into the tank by the swirling flow forming pipe 64 as a swirling flow that flows diagonally downward along the inner circumferential surface of the tank constituting the bubble-containing liquid separation device 60.

Thus, a large swirling flow that flows counterclockwise downward is formed in the tank, a liquid that contains relatively large bubbles and has a smaller specific gravity is concentrated to the central part of the swirling flow, and an ultrafine bubble-containing liquid that contains relatively small ultrafine bubbles and has a larger specific gravity is concentrated to a part along the inner circumferential surface of the tank. The former liquid is discharged from the central liquid discharge port 63, and the latter liquid is discharged from the pressurized liquid discharge port 62.

A physical property in which the rising rate is lower as the size of fine bubbles is smaller is found. By a mechanism using the swirling flow, separation of larger bubbles and smaller fine bubbles promotes. As a result, the liquid in which the ratio of ultrafine bubbles is increased in the swirling flow is discharged from the pressurized liquid discharge port 62. The relatively large bubbles are separated and raised in swirling from a group of ultrafine bubbles by a centrifugal force, and concentrated to the vicinity of the upper central part of the tank, thereby being efficiently discharged.

The amount of relatively large separated bubbles is about 5% of the total amount of bubbles including ultrafine bubbles. The substantially whole amount of bubbles can be separated and removed.

Therefore, in the ultrafine bubble-containing liquid discharged from the pressurized liquid discharge port 62, the amount of fine bubbles having a size of 100 nm or less or 30 nm or less and 10 Å or more is slight, and the content of ultrafine bubbles having a size of 10 Å or less is increased.

By the above-described action mechanism, the ultrafine bubbles are not lost by joining the ultrafine bubbles to fine bubbles that are slightly present and have a size as relatively large as 10 Å or more. Therefore, a specific function of the ultrafine bubbles can be exerted at a later stage.

The presence of ultrafine bubbles could also be confirmed as follows.

I Materials and Devices

1. Materials;

(1) Experiment water: pure water that is boiled and then cooled (water containing no dissolved air)

(2) Synthetic zeolites: 1.5 g of synthetic zeolites having pores of less than 1 nm (3) 600 mL of 1000 mg/L Cs aqueous solution 2. Devices;

(1) Stirring devices (4 devices)

(2) Ultrafine bubble pressurized water production device (3) Device for generating air bubbles for aquarium fish tank (4) Device for measuring dissolved oxygen (DO) (dissolved oxygen meter)

(5) Atomic absorption spectrophotometer for detection of Cs ions

II Procedure 1. 1.5 g of synthetic zeolites are added to 600 mL of 1,000 mg/L Cs aqueous solution, and the mixture is stirred by a stirring device (1 device) to adsorb Cs fine particles on the zeolites.

2. The zeolites on which the Cs fine particles are adsorbed are sufficiently cleaned with experiment water. (The zeolites are cleaned by the stirring device until Cs ions are not detected from the cleaning water by atomic absorbance analysis of Cs ions.)

3. After the cleaning, the zeolites are collected through filtration and water is drained. After the draining, the zeolites are divided into 3 equal parts.

4. Three kinds of sample waters are produced.

(1) By the ultrafine bubble pressurized water production device, ultrafine bubbles are added to experiment water to produce ultrafine bubble-containing water. 100 mL of the ultrafine bubble-containing water is collected as a sample water 1.

(2) By the device for generating air bubbles for aquarium fish tank, air bubbles are added to experiment water to produce bubble-containing water. 100 mL of the bubble-containing water is collected as a sample water 2.

(3) 100 mL of experiment water in which air bubbles are not added is collected as a sample water 3.

(Note) In (1) and (2), bubbles are added for sufficient time.

5. DO of the sample waters 1 to 3 is measured by a dissolved oxygen meter.

6. The sample waters are allowed to stand for a certain period of time until bubbles cannot be visually confirmed in each water of 4 (1) and (2).

7. DO of the sample waters 1 to 3 is measured again by a dissolved oxygen meter.

From this measurement, it is found that the amount of oxygen that is dissolved in the sample water 1 is larger.

8. The sample waters 1 to 3 are poured into a separate stirring device, and the zeolites obtained by draining in 3 are placed in the same amount in each stirring device. DO of each sample water is measured by a dissolved oxygen meter. The Cs ion concentration is measured by an atomic absorption spectrophotometer.

9. After stirring for a predetermined period of time, DO of each sample water in which zeolites are filtered off is measured by a dissolved oxygen meter. The Cs ion concentration is measured by an atomic absorption spectrophotometer.

In the sample water 1, it is understood that a larger amount of oxygen is transferred to zeolites, and Cs ions are discharged from zeolites.

FIG. 7 shows a flow chart of the above-described confirmation procedure.

In the above description, the gas-liquid mixing unit 20 has a configuration in which the ultrafine bubble-containing liquid is repeatedly circulated. However, the present invention is not limited to the configuration. The gas-liquid mixing unit 20 may have a configuration in which at a previous stage of finally forming ultrafine bubbles, the fine bubble-containing liquid in a state where at least bubbles that are slightly larger than ultrafine bubbles are contained is supplied to the gas-liquid mixing unit 20.

Figure 17:
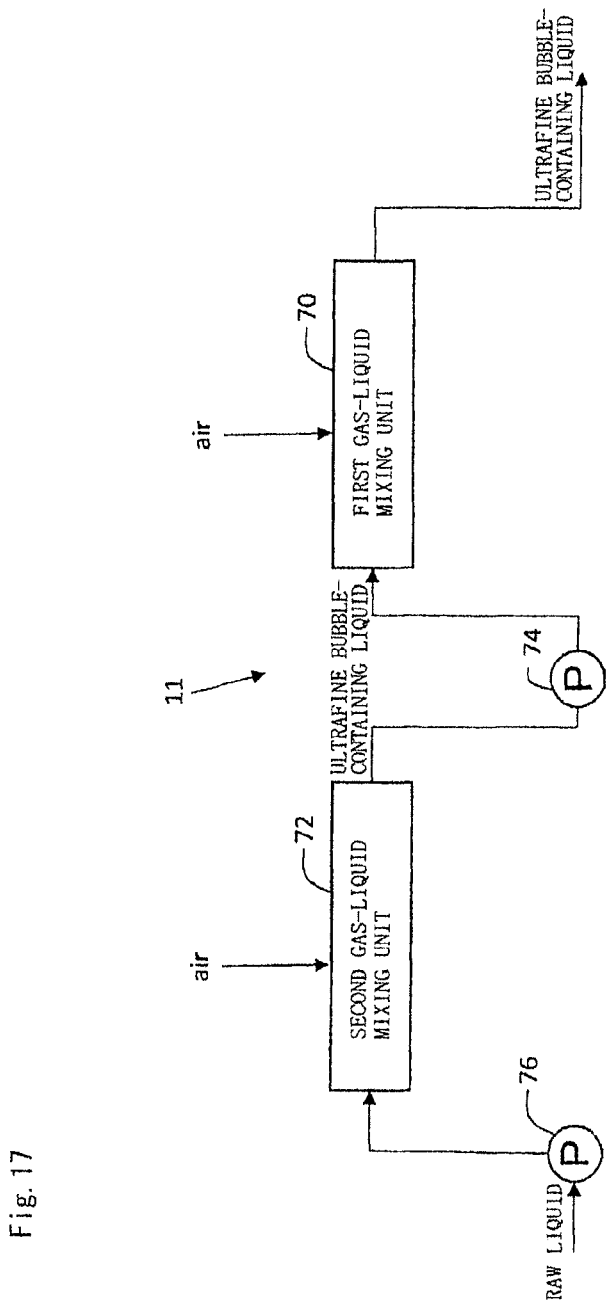
FIG. 17 is a pipe line view showing a modified example of the ultrafine bubble-containing liquid production device.

For example, like the ultrafine bubble-containing liquid production device 11 shown in FIG. 17, a first gas-liquid mixing unit 70 corresponding to the aforementioned gas-liquid mixing unit 20, and a second gas-liquid mixing unit 72 that supplies the fine bubble-containing liquid to the first gas-liquid mixing unit 70 and corresponds to the aforementioned gas-liquid mixing unit 20 are provided as a two-stage configuration. Thus, the ultrafine bubble-containing liquid from the first gas-liquid mixing unit 70 does not need to be circulated.

In this case, a first pressurization pump 74 that supplies the fine bubble-containing liquid to the first gas-liquid mixing unit 70 and a second pressurization pump 76 that supplies a raw liquid to the second gas-liquid mixing unit 72 under pressure are provided.

INDUSTRIAL APPLICABILITY

The present invention is usable in businesses of purifying contaminated soil and contaminated water, businesses of separating and collecting fine particles such as petroleum from seawater and water with dispersed petroleum etc., and businesses of collecting metal micro particles in which collecting is conventionally difficult.

10 . . . ultrafine bubble-containing liquid production device
20 . . . gas-liquid mixing unit
22 . . . liquid flow path
24 . . . inflow port
26 . . . discharge port
28 . . . ejection port
28A . . . gas introduction pipe
28B . . . gas introduction amount controlling valve
30 . . . nozzle
30A . . . tip
30B . . . proximal end
40 . . . swirling flow forming device
42 . . . fixed blades
44 . . . gas guide device
44A . . . tapered inner circumference surface
50 . . . pressurized liquid supply system
52 . . . inflow pipe
54 . . . discharge pipe
56 . . . pressurization pump
57 . . . raw liquid supply pipe
58 . . . transfer pipe
60 . . . bubble-containing liquid separation device
61 . . . pressurized liquid inflow port
62 . . . pressurized liquid discharge port
63 . . . central liquid discharge port
64 . . . swirling flow forming pipe
65 . . . discharge amount controlling valve
70 . . . first gas-liquid mixing unit
72 . . . second gas-liquid mixing unit
74 . . . first pressurization pump
76 . . . second pressurization pump
80, 90 . . . ultrafine bubble cleaning apparatus
82 . . . water reservoir
84 . . . stirring device
85 . . . supernatant discharge device
85A . . . pump
85B . . . floated and separated substance collecting device
85C . . . aggregation reaction tank
86 . . . sedimentation extraction device
87 . . . substance-to-be-cleaned loading device
88 . . . hopper
89A . . . tank
89B . . . pump
92A . . . first small reservoir
92B . . . second small reservoir
94A . . . first stirring device
94B . . . second stirring device
95 . . . water permeable crushed stone subgrade
100 . . . dissolved air floatation apparatus
101A . . . inlet
101B . . . discharge opening
102 . . . dissolved air floatation tank
103 . . . circulating device
103A . . . swirling discharge pipe
103B . . . swirling flow guide
103C . . . gap
104 . . . separated substance extracting device
104A . . . endless chain
104*b* . . . skimmer
104C . . . feed screw
105 . . . flocculant reaction tank device
105A . . . automatic radioactive substance adsorbent dissolving device
105B . . . automatic organing flocculant dissolving device
105C . . . automatic inorganic flocculant dissolving device 105D . . . flocculant reaction tank
105E . . . stirring device
106 . . . pressurized liquid pipe
107 . . . suction pipes
108 . . . collecting pipe
109 . . . rise pipe
110 . . . subtank
111 . . . level control pipe
111A . . . suction opening
112 . . . discharge control device
113 . . . dehydration solidification device

The invention claimed is:

1. A dissolved air floatation apparatus comprising an ultrafine bubble-containing liquid production device and a dissolved air floatation tank,
the ultrafine bubble-containing liquid production device comprising a gas-liquid mixing unit and a bubble-containing liquid separation device,
the gas-liquid mixing unit comprises
a liquid flow path capable of passing a liquid,
a liquid inflow port provided at one end of the liquid flow path,
a bubble-containing liquid discharge port provided at the other end, and
an ejection port that is formed between the liquid inflow port and the bubble-containing liquid discharge port so that the gas can flow from a side to the liquid flow path,
the bubble-containing liquid separation device comprises a storage type pressurized liquid tank and
the bubble-containing liquid separation device swirls a liquid containing ultrafine bubbles having a size of 3 Å or more and less than 10 Å and bubbles larger than the ultrafine bubbles in the storage type pressurized liquid tank in a full state all the time to concentrate a part of the liquid that contains the ultrafine bubbles and has a relatively large specific gravity outside a swirling flow, and concentrate a part of the liquid that contains bubbles larger than the ultrafine bubbles and has a relatively small specific gravity to a central part of the swirling flow followed by discharge,
the storage type pressurized liquid tank comprises
a pressurized liquid inflow port that is provided on an upper side face of the tank and into which the ultrafine bubble-containing liquid transferred from the gas-liquid mixing unit in the ultrafine bubble-containing liquid production device flows,
a pressurized liquid discharge port provided at a lower side face of the tank for discharging the part of the liquid that contains the ultrafine bubbles,
a central liquid discharge port provided at an upper end of the tank for discharging part of the liquid that contains bubbles larger than the ultrafine bubbles, and
a swirling flow forming pipe that is provided inside the pressurized liquid inflow port and converts the flowing-in pressurized liquid into a downward swirling flow in the tank, so as to produce an ultrafine bubble-containing liquid concentrated to outside the swirling flow, and
the dissolved air floatation tank comprises an inlet at one end,
wherein the ultrafine bubble-containing liquid from the pressurized liquid discharge port is mixed in a raw liquid comprising a subject to be cleansed and is poured into the dissolved air floatation tank from the inlet to cause a suspended substance and a dissolved component in the raw liquid to be adsorbed on an interface of fine bubbles and be floated in the dissolved air floatation tank, and the suspended substance and the dissolved component are extracted as a suspended and separated substance from the raw liquid, and a remaining raw liquid is discharged as a treated liquid, the dissolved air floatation apparatus further comprising:
a circulating device that comprises a swirling discharge pipe, a swirling flow guide, and a gap, the swirling discharge pipe is provided on an end portion of the dissolved air-flotation tank so as to be projected, a tip of the swirling discharge pipe is curved diagonally upward, and a tip opening thereof serves as the inlet, the swirling discharge pipe has a curved pipe shape with which the mixed liquid of the raw liquid and the ultrafine bubble-containing liquid from the pressurized liquid discharge port is jetted diagonally upward, and is configured to jet the mixed liquid, and to circulate the mixed liquid in the dissolved air floatation tank; and
a separated substance extracting device that comprises plurality of skimmers, and is configured such that the skimmers sweep a scum floated on the liquid surface in the dissolved air floatation tank; and
a discharge opening for discharging a remaining liquid after the scum is extracted as a treated liquid,
wherein the dissolved air floatation apparatus is operated for a predetermined time, the sedimentation isolates are settled on the bottom face of the dissolved air floatation tank and the sedimentation isolates are also sucked from the gap to the swirling flow guide and circulated in the dissolved air floatation tank together with the swirling flow from the swirling discharge pipe.

* * * * *